(12) United States Patent
Hernández Alonso et al.

(10) Patent No.: US 11,885,032 B2
(45) Date of Patent: Jan. 30, 2024

(54) ELECTROCHEMICAL PROCESS

(71) Applicant: REPSOL, S.A., Madrid (ES)

(72) Inventors: María Dolores Hernández Alonso, Mostoles (ES); Valentín Ruíz Santa Quiteria, Mostoles (ES); Juan Pérez Mercader, Arlington, MA (US)

(73) Assignee: REPSOL, S.A., Madrid (ES)

( * ) Notice: Subject to any disclaimer, the term of this patent is extended or adjusted under 35 U.S.C. 154(b) by 559 days.

(21) Appl. No.: 16/954,767

(22) PCT Filed: Dec. 19, 2018

(86) PCT No.: PCT/EP2018/085843
§ 371 (c)(1),
(2) Date: Jun. 17, 2020

(87) PCT Pub. No.: WO2019/121915
PCT Pub. Date: Jun. 27, 2019

(65) Prior Publication Data
US 2021/0087696 A1    Mar. 25, 2021

(30) Foreign Application Priority Data

Dec. 19, 2017 (EP) .................................. 17382867

(51) Int. Cl.
*C25B 1/55* (2021.01)
*C25B 15/02* (2021.01)
*C25B 9/73* (2021.01)
*C25B 11/031* (2021.01)
*C25B 11/051* (2021.01)
(Continued)

(52) U.S. Cl.
CPC .................. *C25B 1/55* (2021.01); *C25B 1/04* (2013.01); *C25B 3/25* (2021.01); *C25B 9/73* (2021.01); *C25B 11/031* (2021.01); *C25B 11/051* (2021.01); *C25B 15/02* (2013.01)

(58) Field of Classification Search
CPC .... C25B 1/55; C25B 3/25; C25B 1/04; C25B 15/02–15/033
See application file for complete search history.

(56) References Cited

U.S. PATENT DOCUMENTS

2013/0277209 A1    10/2013 Sato et al.

FOREIGN PATENT DOCUMENTS

JP    S53088686 A    8/1978
JP    H08296077 A    11/1996
(Continued)

OTHER PUBLICATIONS

Hara et al.("Influence of a Positively Charged Moiety on Aggregation-Disaggregation Self-Oscillation Induced by the BZ Reaction", Macromolecular Chemistry and Physics, 2009, 210, pp. 2160-2166) (Year: 2009).*

(Continued)

*Primary Examiner* — Alexander W Keeling
(74) *Attorney, Agent, or Firm* — Squire Patton Boggs (US) LLP

(57) ABSTRACT

The present invention relates to an electrochemical device and a method for operating the electrochemical device for inducing specific behaviours in its chemical kinetics by supplying externally selected random (stochastic) voltage perturbations while the electrochemical system is operating in a non-oscillatory regime.

11 Claims, 20 Drawing Sheets

(51) Int. Cl.
    C25B 3/25    (2021.01)
    C25B 1/04    (2021.01)

(56) References Cited

FOREIGN PATENT DOCUMENTS

| WO | WO 2006/082801 | | 8/2006 |
|---|---|---|---|
| WO | WO 2012/091045 | A1 | 7/2012 |
| WO | WO 2016/097247 | A1 | 6/2016 |

OTHER PUBLICATIONS

Simakov et al ("Effect of Noise Correlation on Noise-Induced Oscillation Frequency in the Photosensitive Belousov-Zhabotinsky Reaction in a Continuous Stirred Tank Reactor", The Journal of Physical Chemistry A, 2013, 117, pp. 13999-14005) (Year: 2013).*
International Search Report and Written Opinion dated Apr. 1, 2019 for Application No. PCT/EP2018/085843, 17 pages.
Castro, et al.: "The application of electrochemical impedance spectroscopy and identification procedures to the investigation of the dissolution and passivation of iron in carbonate-bicarbonate buffers at 25° C.", *Electrochemica Acta 1991*, vol. 36, No. 1, pp. 117-126.
Diez-Garcia, et al.: "Investigating water splitting with CaFe2O4 photcathodes by of electrochemical impedance spectroscopy", *Applied Materials & Interfaces 2016*, vol. 8, p. 21387-21397.
Gabrielli, et al.: "Comparison of sine wave and white noise analysis for of electrochemical impedance measurements", *Journal of Electroanalytical Chemistry 1992*, vol. 335, pp. 33-53.
Gimenez, et al.: "Carrier density and interfacial kinetics of mesoporous TiO2 in aqueous electrolyte determined by impedance spectroscopy", *Journal of Electroanalytical Chemistry 2012*, vol. 668, pp. 119-125.
Koper "Non-linear phenomena in electrochemical systems", *Journal of the Chemical Society*, Faraday Transactions, 1998, vol. 94, No. 10, pp. 1369-1378.
Simakov, et al.: "Effect of noise correlation on noise-induced oscillation frequency in the photosensitive Belousov-Zhabotinsky Reaction in a continuous stirred tank reactor", *Journal of Physical Chemistry A*, Nov. 25, 2013, vol. 117, pp. 13999-14005.
Notification of Reasons for Refusal dated Jul. 4, 2023, issued for Japanese Patent Application No. 2020-533216; with English translation, 8 pages.
Notification of Reasons for Refusal dated Dec. 13, 2022, issued for Japanese Patent Application No. 2020-533216; with English translation, 6 pages.

* cited by examiner

ELECTROCHEMICAL PROCESS

CROSS-REFERENCE TO RELATED APPLICATIONS

This application is a national-stage filing under 37 USC 371(c) of International Application No. PCT/EP2018/085843, file Dec. 19, 2018, which claims priority to, and the benefit of, European Patent Application 17382867.4, filed Dec. 19, 2017, the entire contents of each of which are herein incorporated by reference in their entirety for all purposes.

The present disclosure relates to a method for operating an electrochemical device for inducing or improving a nonlinear electrochemical reaction operating in its non-oscillating regime.

BACKGROUND ART

In an oscillatory chemical reaction, the concentrations of some reactants and products change with time in a periodic or quasi-periodic manner. These oscillations are a consequence of the out-of-equilibrium nature of the reaction and its non-linear kinetics. The prototype of an oscillatory reaction is the Belousov-Zhabotinsky reaction where the catalyst displays redox (reduction-oxidation) oscillations. Given a reaction, its oscillatory features, such as period or amplitude, are controlled by the concentrations of the various reactants.

A remarkable aspect of the dynamical behaviour of nonlinear chemical systems is their response to stochastic fluctuations applied to a control parameter of the reaction such as catalyst concentration or temperature. An interesting example of this phenomenon is the noise-induced effects observed for the photosensitive Belousov-Zhabotinsky oscillatory reaction (Journal of Physical Chemistry A, 2013, Vol. 117, 13999-14005). In this work, Perez-Mercader et al. observed that in the absence of deterministic oscillations and any external periodic forcing, oscillations appeared when the system was perturbed in the vicinity of the bifurcation point by stochastic fluctuations under light irradiation with sufficiently high amplitude. It was also found that the frequency distribution of the noise-induced oscillations was strongly affected by the nature of the noise correlation function, proving the argument that stochastic perturbations applied to a nonlinear chemical reaction can modify reaction constants in a way that depends on noise correlation.

In an electrochemical device, an electrochemical reaction occurs on the surface of an electrode that is immersed in an electrolyte and involves the transfer of an electron from species dissolved in the electrolyte to the electrode (oxidation reaction) or from the electrode to the species in the electrolyte (reduction reaction). These electron transfer reactions might be preceded, accompanied or followed by further elementary steps analogous to the ones occurring in a heterogeneous surface reaction, i.e. diffusion to or from the electrode, adsorption on the electrode surface, surface diffusion, reactions with other species and desorption from the electrode surface. Because of the electron transfer steps, the rate of an electrochemical reaction depends on the electrostatic potential of the electrode.

The photoelectrochemical (PEC) approach is based on the utilization of semiconductor electrodes in the electrochemical cell, activated under irradiation (e.g. solar radiation). The absorption of photons with energy equal to or greater than the band gap in a semiconductor leads to excitation of electrons from the valence to the conduction band. This property of semiconductor materials has been successfully used in photovoltaic devices to convert solar energy into electrical energy. In photocatalysis, the electron-hole pair is immediately used to drive a redox reaction but the problem is that the electron-hole pair suffers from fast recombination. In photoelectrocatalysis, redox reactions are spatially separated and occur on two electrodes electrically connected, diminishing the number of recombinations between the electrons and the holes. A potential difference can be applied to increase the yield of light conversion into chemical energy. A PEC system with a bias voltage has the advantage of, not only decreased charge recombination, but also supplying the additional energy needed for the reaction of interest to occur. A PEC system could have different configurations depending on which electrode would become the light-absorbing photoelectrode, i.e. the anode, the cathode, or both.

As it has been reported by Marc T. M. Koper in the Journal of the Chemical Society, Faraday Transactions, 1998, Vol. 94 (10), 1369-1378, there exist non-linearities in out-of-equilibrium electrochemical systems when, for example, they are in an oscillatory regime.

Spontaneous fluctuation of the current and potential of a corroding electrode, which is commonly referred to as electrochemical noise (EN), has also been extensively studied in the past two decades in order to better understand corrosion and inhibition mechanisms in various environments. The major sources of electrochemical noise observed in corrosion can be ascribed to phenomena, such as partial faradaic currents, adsorption or desorption processes, particularly the initiation of pitting, all of which have a random character. It is worth remarking that in these cases, fluctuations arise spontaneously and they are not, in any case, being externally introduced into the system.

SUMMARY OF THE INVENTION

In a first aspect of the present invention a method is provided for operating an electrochemical device for inducing or improving a nonlinear chemical reaction operating in its non-oscillatory regime, wherein the electrochemical device comprises a working electrode, a counter electrode, and at least one electrolyte; the method comprising supplying intentionally an extrinsic stochastic disturbance to the potential difference of the electrochemical device, such that a nonlinear chemical reaction operating in a non-oscillatory regime is induced, or the behaviour of a non-linear electrochemical reaction operating in non-oscillatory regime which is performed on the electrochemical device is improved.

The extrinsic stochastic disturbance is intentionally supplied to the potential difference, and it is higher in absolute value and different to the inherent and intrinsic noise present within any signal. In the context of the present application, the expression "extrinsic disturbance" refers to those disturbances which are different to the inherent and intrinsic disturbance which cannot be controlled. Thus, the herein intentionally supplied extrinsic stochastic disturbance does not depend on the applied potential, and it is externally controlled, since it is of unknown and random magnitude in each of the pulses, but follows a determined (controlled) distribution around a selected value (mean value), which in some embodiments of the present invention is around the value of the $E_{onset}$ of the reaction. Inherent and intrinsic noise signals, present in any electrochemical system, show unknown and random magnitudes which cannot be controlled.

As far as the applicant is aware, the intentional application of an extrinsic stochastic disturbance to the potential difference on a non-oscillating electrochemical system, and more specifically on a non-oscillating photoelectrochemical system, where light is also playing a role on the current-voltage relationship, has not been disclosed in the prior art.

Phenomena induced by noise, such as stochastic resonance or coherence resonance, have only been disclosed in oscillatory systems and would not be obviously expected in purely dissipative systems, including non-linear chemical systems.

It has been surprisingly observed that the introduction of an extrinsic stochastic disturbance to the potential difference in an electrochemical reaction leads to an increase in the current intensity. Thus, when an extrinsic stochastic disturbance is applied to the potential difference of the electrochemical device, a current intensity is obtained, where the current intensity thus obtained is larger than the current intensity obtained when a potential difference of the same magnitude is supplied to the electrochemical device but in the absence of an extrinsic stochastic disturbance. Therefore, as a consequence of the resulting larger current intensity, in the specific case of an anodic reaction, a higher oxidation degree of the target molecule takes place after the same period of time versus the oxidation degree of the target molecule when no extrinsic stochastic disturbance is intentionally supplied to the potential difference of the electrochemical device for the same length of time. Alternatively, when the target reaction is the reduction of the target molecule, a higher reduction degree of the target molecule occurs after the same period of time versus the reduction degree of the target molecule when no extrinsic stochastic disturbance is intentionally supplied to the potential difference of the electrochemical device for the same period of time. Put in other words, in the absence of the intentionally supplied extrinsic stochastic disturbance, a significantly larger potential difference must be applied in order to reach the same oxidation or reduction degree after the same period of time when compared to a signal wherein an extrinsic stochastic disturbance to the potential difference is intentionally supplied.

Thus, it has been observed that in the presence of an intentionally supplied extrinsic stochastic disturbance to the potential difference, a higher charge is achieved Q (Q=I×t).

A second aspect of the invention is an electrochemical device to induce or improve a nonlinear electrochemical reaction operating in its non-oscillating regime, the device comprising:
i) a working electrode comprising a first electrically active material;
ii) a counter electrode comprising a second electrically active material, the counter electrode being arranged spaced apart from the first electrode;
iii) at least one electrolyte;
and
iv) means for supplying an extrinsic stochastic disturbance to the potential difference of the electrochemical device;
wherein in use, an extrinsic stochastic disturbance is supplied to the potential difference of the electrochemical device such that a nonlinear chemical reaction operating in non-oscillatory regime is induced.

In the context of the present invention, the expression "extrinsic stochastic disturbance" and variations thereof are referred herein also as "noisy disturbance" or "noise"; which is clearly distinguishable from the inherent and intrinsic noise present within any signal. Thus, the herein referred extrinsic stochastic disturbance is an additive noise intentionally supplied to the potential difference of the electrochemical system.

BRIEF DESCRIPTION OF THE DRAWINGS

Non-limiting examples of the present disclosure will be described in the following, with reference to the appended drawings, in which.

DETAILED DESCRIPTION

Figure 1:
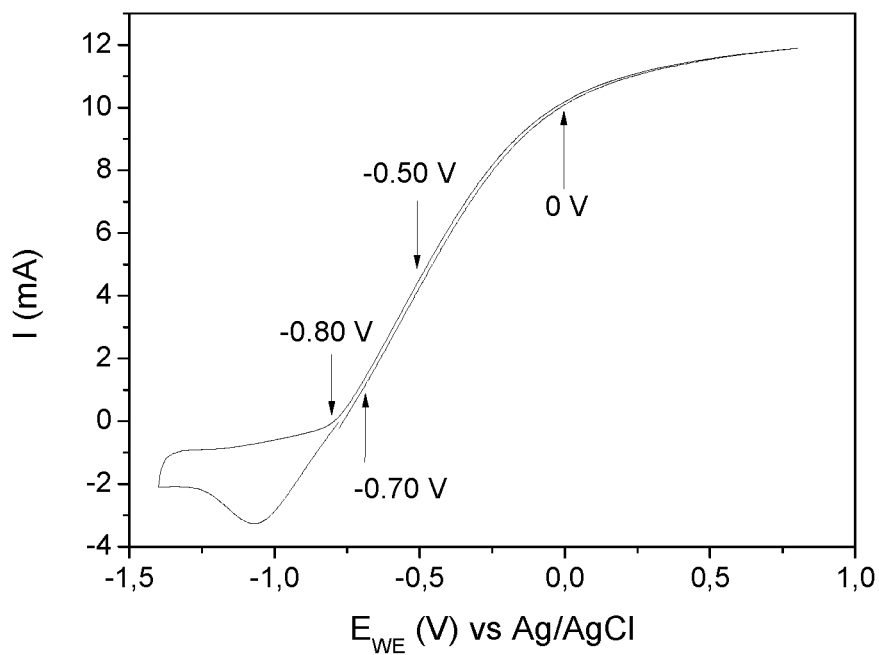
FIG. 1. Cyclic voltammetry of the $TiO_2$ photoanode of Example 1 in 0.5M NaOH under UV irradiation. Some $E_{WE}$ mean values applied in the following chronoamperometry experiments have been marked with arrows for the sake of clarity.

Since a stochastic disturbance (noise) is a random signal, it can be described by various parametric and statistical properties. The mathematical model for noise is a so-called stochastic process, which is defined as a sequence of random events. The power spectral density (power and distribution in the frequency spectrum, PSD) is one of the properties that can be used to distinguish among different types of noise. If the PSD is not flat, then the noise is said to be "colored" (correlated). On the other hand, White noise is a random signal in time (stochastic process) characterized by the fact that its signal values at two different times are uncorrelated. Consequently, its power spectral density (PSD) over the entire frequency band is a constant, thus, its graph is flat. This means that the signal contains all the frequencies and they all show the same constant power. In other words, White noise is a non-correlative signal, that is, in the time axis the signal takes values without any correlation among them. Depending on the shape of the PSD, different types of colored noises are defined.

In the context of the present invention, it is important to distinguish between pulses and noise. Pulses have a fixed amplitude and are separated by finite times (finite values or deterministic function), whereas in the case of a random signal (noise), the characteristics are completely different (uncorrelated values or random correlation). For the case of extrinsic stochastic disturbance signals (noisy signals) we may not give time to our system to relax or to dissipate energy, and the stochastic disturbance keeps the system excited using a minimal amount of energy.

Additionally, it should be taken into account the differences between chemical reactions operating in an oscillatory regime and in a non-oscillatory regime. The reaction mechanisms of all known chemical oscillators have at least three common features. First, while the oscillations occur, the chemical mixture is far from equilibrium, and an energy releasing reaction occurs whose energy drives the oscillating "sideshow". Second, the energy-releasing reaction can follow at least two different pathways, and the reaction periodically switches from one pathway to another. Third, one of these pathways produces a certain intermediate, while another pathway consumes it, and the concentration of this intermediate functions as a "trigger" that switches from one pathway to the other. When the concentration of the said intermediate is low, the reaction follows the producing pathway, leading to a relatively high concentration of the intermediate. When the intermediate's concentration is high, the reaction switches to the consuming pathway, and the concentration of the intermediate decreases. Eventually the reaction reverts to the producing pathway. The reaction repeatedly switches from one pathway to the other.

Chemical reactions operating in a non-oscillatory regime are dissipative systems, wherein the system variables do not follow an harmonic function (they correspond to "relaxation oscillations"), and the system is away from the equilibrium state.

As used herein the term "noisy potential" refers to a sequence of random values of an electrical potential fluctuating around a mean value whose power spectral density depends on the type of noise (stochastic disturbance).

Electrochemical reactions exhibit nonlinear dynamics, as evidenced by the non-linear relationship between electric current and applied voltage between electrodes.

Electrochemical systems can be easily driven away from the equilibrium state by, for example, modifying the cell voltage or the working electrode potential in a three-electrode system. The electrode kinetics involves the determination of the dependence of current on potential.

Specifically, for a photoelectrochemical system, the I-V curve has a sigmoidal shape where different regions can be described, a first region near $E_{onset}$ controlled by activation, an intermediate region dominated by mixed control, where the higher the applied potential the higher the measured current intensity, and a last region, controlled by diffusion, where current no longer depends on potential.

As used herein, the term "dissipative regime" refers to a system operating out of thermodynamic equilibrium and which exchanges energy and matter with the environment.

As used herein, the term "non-oscillatory regime" refers to the state of a system where variables do not follow a periodic repetitive function.

As used herein, the term "Gaussian noise pattern" refers to a noise signal described by a Gaussian function. In other words, a Gaussian noise is a noise having a Gaussian probability density function, wherein the probability density function p of a Gaussian random variable z is given by the following equation:

$$p_G(z) = \frac{1}{\sigma\sqrt{2\pi}} e^{-\frac{(z-\mu)^2}{2\sigma^2}}$$

wherein μ represents the mean value and σ represents the standard deviation of the noisy signal.

As mentioned above, the present invention relates to a method for operating an electrochemical device for selectively inducing or improving desirable behaviours on nonlinear chemical reactions based on the nature of their chemical kinetics while operating in a non-oscillatory regime, the method comprising supplying an extrinsic stochastic disturbance to the potential difference of the electrochemical device, such that specific effects are induced or improved in the nonlinear chemical reaction by the stochastic signal when the nonlinear chemical reaction is operating in a non-oscillatory regime.

When the system is working around the $E_{onset}$ but wherein $E_{we}$ is lower or equal to the $E_{onset}$, supplying an extrinsic stochastic disturbance to the potential difference according to the present invention, the system passes from no current intensity state (and thus no reaction occurs) in absence of the extrinsic stochastic disturbance to inducing the reaction in presence of the supplied extrinsic stochastic disturbance. When the system is working above the $E_{onset}$, reaction takes place in absence of the supplied extrinsic stochastic disturbance, but when extrinsic stochastic disturbance is supplied, desirable behaviours are induced or improved; examples of said desirable behaviours are the efficiency of reaction, the distribution of reaction products, and others.

Thus, the present invention provides a method for operating the electrochemical device for inducing or improving a nonlinear chemical reaction operating in its non-oscillatory regime; wherein the electrochemical device comprises a working electrode, and a counter electrode, and at least one electrolyte; and wherein the method comprises intentionally supplying an extrinsic stochastic disturbance to the potential difference of the electrochemical device. In accordance with some examples of configuration of the electrochemical device, it comprises at least a working electrode and a counter electrode, and at least one electrolyte; and the method comprises supplying an extrinsic stochastic disturbance (extrinsic and controllable noise signal) to the potential difference of the electrochemical device, such that a nonlinear chemical reaction operating in a non-oscillatory regime is induced.

In accordance with some examples, the electrochemical device comprises at least a working electrode, a counter electrode and a reference electrode; and at least one electrolyte; wherein the method comprises supplying an extrinsic stochastic disturbance to the potential difference of the electrochemical device, by imposing intentionally an extrinsic stochastic disturbance to the voltage of the working electrode with respect to the reference electrode, such that a nonlinear chemical reaction operating in a non-oscillatory regime is induced.

In accordance with the process of operating the electrochemical device of the present invention, it has been unexpectedly observed that by introducing an extrinsic stochastic disturbance to the applied voltage, current intensities are measured at voltages where no current is obtained in the absence of such an extrinsic stochastic disturbance. This effect is especially relevant in the surroundings of the electrode onset potential ($E_{onset}$), meaning that ratios between current intensity values obtained in the absence of the extrinsic stochastic disturbance (non-noisy) and in presence of the supplied extrinsic stochastic disturbance (noisy) periods are more significant in the vicinity of $E_{onset}$. The potential at which the phenomenon (electrochemical reaction) begins to occur is the current onset potential ($E_{onset}$). This increment could be ascribed to double layer charging current (capacitive current) which is usually considered as interfering in electrochemical experiments. Nevertheless, quantification experiments have proven that the observed increase in current is translated into an improved performance of the electrode. Thus, in accordance with some examples, the extrinsic stochastic disturbance intentionally supplied to the potential difference according to the method of operating an electrochemical device of the present invention, is within the range $-1\ V \leq E_{onset} \leq +1\ V$; preferably in the range $-0.5\ V \leq E_{onset} \leq +0.5\ V$; more preferably in the range $-0.2\ V \leq E_{onset} \leq +0.2\ V$; being particularly preferred in the range $-0.04\ V \leq E_{onset} \leq +0.04\ V$.

In accordance with some examples of the method of the present invention, the extrinsic stochastic disturbance application interval is comprised from 0.001 seconds to 5 seconds; preferably from 0.01 seconds to 3 seconds; more preferably from 0.05 seconds to 1.5 seconds. Particular embodiments relate to extrinsic stochastic disturbance application intervals comprised from 0.01 seconds to 3 seconds; alternatively from 0.01 seconds to 1.5 seconds.

It has also been observed that the extrinsic stochastic disturbance supplied to the potential difference of the electrochemical system reduces the activation energy in a non-oscillatory system; acting in some way as a catalyst in the electrochemical reaction. Therefore, in accordance with an aspect of the present invention, it is provided the use of an extrinsic stochastic disturbance supplied to the potential difference (noisy potential difference) as a catalyst to induce or improve a nonlinear electrochemical reaction operating in its non-oscillatory regime.

The observed effects are expected to have implications in other electrochemical and photoelectrochemical processes.

In accordance with some examples of the present invention, the method further comprises
i) identifying a non-noisy potential difference (i.e. a potential difference in the absence of a intentionally supplied extrinsic stochastic disturbance to the potential difference) to be supplied to the electrochemical device which is needed to induce a nonlinear chemical reaction operating in its non-oscillatory regime, thus obtaining a first current intensity;

ii) supplying a noisy potential difference (i.e. supplying an extrinsic stochastic disturbance to the potential difference) to the electrochemical device, thus obtaining a second current intensity;

in such a way that the noisy potential difference supplied in ii) is lower than the first potential difference previously identified in i); and the current intensity obtained in ii) being larger to the first current intensity obtained in i); thereby a nonlinear chemical reaction operating in non-oscillatory regime is induced.

In the context of the present invention, a "lower noisy potential difference" refers to a potential difference resulting from the intentional supplying an extrinsic stochastic disturbance to the potential difference which is "smaller in absolute value"; whereas a "larger noisy potential difference" refers to a potential difference resulting from the intentional supplying of an extrinsic stochastic disturbance to the potential difference which is "higher in absolute value".

In the context of the present invention, supplying a noisy potential difference to the electrochemical device means that an extrinsic stochastic disturbance is intentionally supplied to the potential difference which is supplied to a working electrode with respect to a reference electrode, while electric current is measured between the working electrode and a counter electrode, wherein the counter electrode acts as a cathode when the working electrode is an anode and on the other hand, the counter electrode acts as anode when the working electrode is a cathode. Alternatively, when a two electrode system is used, potential difference and electric current are established between the two electrodes.

In accordance with some examples of the present invention, the intentionally supplied extrinsic stochastic disturbance may follow a Constant White noise pattern, a Colored noise pattern or a Gaussian noise pattern. In accordance with some particular examples, the intentionally supplied extrinsic stochastic disturbance may follow a Constant White noise pattern, a Pink noise pattern, or a Gaussian White noise pattern.

In some examples of the present invention, the working electrode acts as anode, thereby the oxidation reaction of the target molecule takes place on its surface.

Alternatively, in some other examples, the working electrode acts as cathode, thereby the reduction reaction of the target molecule takes place on its surface.

In accordance with some preferred examples, the method of operation is conducted under irradiation to take advantage also of the photocatalytic character of the photoelectrodes.

In some examples, photoelectrodes comprise a photoelectrocatalyst layer made of a photoelectrically active material, a semiconductor, which may be selected from a metal, metal oxide or metal hydroxide, metal nitride, metal phosphide or a conductive polymer. In these cases, charge carriers in the form of electron-hole pairs are generated in the semiconductor under irradiation, where the photogenerated minority carriers arrive at the interface of the semiconductor-electrolyte where they are involved in redox reactions.

In some other examples, the photoelectrode comprises different components including at least a photoactive material, able to generate charge carriers under irradiation, and an electrocatalyst. The electrocatalyst may be selected as a function of the reaction to be carried out inside the photoelectrochemical device which is an evident selection to those skilled in the art.

The photoelectrode extends from a front-end surface to an opposing back-end surface. Thus, in accordance with some examples of the present invention, the photoelectrode is arranged so that in use, an incident light irradiates its front end surface which also contacts at least one electrolyte of the electrochemical cell, or alternatively, an incident light irradiates its back end surface and its front end surface contacts at least one electrolyte of the electrochemical cell.

In some examples, the electrocatalyst may be made from a catalyst selected from hydrogen evolution reaction (HER) catalysts, able to reduce water into hydrogen, or $CO_2$ reduction catalysts, able to reduce $CO_2$ into products such as $CO$, $CH_4$, $HCOOH$ and $C_2H_4$. In alternative cases, other catalysts may be foreseen such as, e.g. nitrates and nitrites reduction catalysts in water solutions.

In accordance with some examples, the electrocatalyst may be made from a catalyst selected from oxygen evolution reaction (OER) catalysts. OER catalysts are able to oxidize water into oxygen. Examples of these catalysts may comprise Nickel (Ni), Iron-nickel alloy (Ni—Fe), molybdenum (Mo), iron (Fe), iridium (Ir), tantalum (Ta), ruthenium (Ru), and its alloys, hydroxides, oxides. In alternative cases, other catalysts may be foreseen, e.g. catalysts for electro-oxidation of pollutants in water solutions.

In all cases, the choice of electrocatalyst may depend on the reaction to be carried out in the electrochemical cell, i.e. the target molecule to be reduced or oxidized. In general terms, if the photoelectrode is a photoanode, then good oxygen evolvers are desired such as OER catalysts able to oxidize e.g. water into oxygen. If the photoelectrode is a photocathode, then electrocatalysts able to reduce water to hydrogen (HER catalysts) are desired. Alternatively, electrocatalysts able to reduce $CO_2$ to valuable products, such as Sn-based electrocatalysts, when the $CO_2$ is reduced to formate, are desired.

In general, the aim is to provide an electrocatalyst that is suitable for the desired oxidation or reduction reaction. The electrocatalyst may be deposited by several methods, directly onto the surface of the electrode, onto a protective coating or over a more porous and conductive substrate, as a metallic mesh or foam, to increase the active surface area, thus enhancing the electronic transfer at the contact surface with the electrolyte.

In other embodiments and depending on the expected reaction to be carried out within the photoelectrochemical device, the supporting electrolyte may comprise a salt of the formula $M_mY_n$ in which M may be selected from lithium, potassium, sodium, magnesium, calcium, and strontium; Y may be either a hydroxide ion or a counter ion coming from mineral acids selected from halides, sulphates, carbonates, bicarbonates, nitrates, chlorates and phosphates. In some of these cases, the electrolyte may be selected from NaOH, KOH, $H_2SO_4$, KCl, HCl, $KClO_4$, $H_3PO_4$, $NaHCO_3$, $NaCO_2CH_3$, $KHCO_3$, $K_2CO_3$, $K_2HPO_4$, $K_2SO_4$ and $Na_2SO_4$.

In some embodiments, the incident light may be natural sunlight or any type of radiation source that comprises the absorption range of the semiconductor, the photoactive material. This means substantially any radiation source having a wavelength in the central range of the solar spectrum. Generally, incident light comprising a wavelength in the 300-1100 nm region may be used.

In accordance with some examples of the second aspect of the present invention, it is provided an electrochemical device to induce or improve a nonlinear electrochemical reactions operating in its non-oscillating regime, the device comprises:

i) a working electrode comprising a first electrically active material;
ii) a counter electrode comprising a second electrically active material, the second electrode being arranged spaced apart from the working electrode;
iii) a reference electrode
iv) at least one electrolyte;
and
v) means for supplying intentionally an extrinsic stochastic disturbance to the potential difference (noisy potential difference) of the electrochemical device;
wherein in use an extrinsic stochastic disturbance is intentionally supplied to the potential difference of the electrochemical device by imposing intentionally an extrinsic stochastic disturbance to the voltage of the working electrode, which results from the supplying of an extrinsic stochastic disturbance to the potential difference, with respect to the reference electrode such that a nonlinear chemical reaction operating in non-oscillatory regime is induced or improved.

Related to the electrochemical device of the present invention, in accordance with some examples, the working electrode is confined in a first compartment, whereas the counter electrode is confined in a second compartment, and the electrochemical cell may include an electrolyte flow.

Therefore, in accordance with those examples wherein the working electrode acts as anode and the counter electrode acts as cathode:
i) the working electrode is confined in an anodic compartment, the working electrode comprises an anode support frame comprising an anodic material which acts as anode, a fluid distribution frame; and one or more anodic gaskets;
ii) the counter electrode is confined in a cathodic compartment, the counter electrode comprises a cathode support frame comprising a cathodic material which acts as cathode, a fluid distribution frame, and one or more cathodic gaskets; and
iii) optionally, the electrochemical device may further comprise a reference electrode.

Whereas, in accordance with those examples wherein the working electrode acts as cathode and the counter electrode acts as anode:
i) the working electrode is confined in a cathodic compartment, the working electrode comprises a cathode support frame comprising a cathodic material which acts as cathode, a fluid distribution frame, and one or more cathodic gaskets;
ii) the counter electrode is confined in an anodic compartment, the counter electrode comprises an anode support frame comprising an anodic material which acts as anode, a fluid distribution frame, and one or more anodic gaskets; and
iii) optionally, the electrochemical device may further comprise a reference electrode.

Thus, in accordance with some examples of the present invention, in the electrochemical device, at least one of the working electrode or the counter electrode comprises a photoactive material. In accordance with a preferred example, the working electrode comprises a photocatalytic anodic material which acts as a photoanode.

In accordance with some examples of the present invention, in the electrochemical device the working electrode comprises a photocatalytic anodic material which acts as a photoanode, and the cathodic material is a conductive porous electrode with immobilized $CO_2$ electrocatalyst material.

Thus, in accordance with some examples of the present invention, the electrochemical device comprises a working electrode which comprises a photoelectrically active anodic material which acts as a photoanode, a counter electrode which comprises a cathodic material which acts as a cathode; and wherein the cathodic material is a conductive porous electrode with immobilized $CO_2$ electrocatalyst material.

In particular examples of the present invention, the electrochemical device comprises:
a) a cathodic compartment which comprises a cathode support frame comprising a cathodic material which acts as cathode; a fluid distribution frame; and one or more cathodic gaskets;
b) an anodic compartment which comprises an anode support frame comprising an anodic material which acts as an anodic electrode; a fluid distribution frame; and one or more anodic gaskets; and
c) an ion-exchange separator disposed between the cathodic compartment and the anodic compartment;
d) means for supplying intentionally an extrinsic stochastic disturbance to the potential difference of the electrochemical device; and
wherein the fluid distribution frames, cathodic gaskets or anode gaskets respectively, are arranged such that in use they allow introducing a catholyte or anolyte into the cathodic or anodic compartment through an inlet port and they allow exiting the catholyte or anolyte, respectively, and the products jointly through an outlet port. Thus, wherein in use, induction or an improvement of a nonlinear chemical reaction operating in its non-oscillatory regime is obtained.

In accordance with some particular examples of the present invention, in the electrochemical device,
i) the cathodic material is an electrode with immobilized hydrogen evolution reaction (HER) electrocatalyst material;
ii) the fluid distribution frame, cathodic gaskets or anode gaskets, respectively, are arranged such that in use they allow introducing a catholyte or anolyte, into the cathodic or anodic compartment through an inlet port and they allow exiting the catholyte or anolyte, respectively, and the products jointly through an outlet port; and
iii) the anodic material is an electrode containing an oxygen evolution reaction (OER) electrocatalyst material. Thus, wherein in use, a nonlinear chemical reaction operating in non-oscillatory regime is induced or improved in the electrochemical device.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims.

Example 1. Oxygen Evolution Reaction (OER) on $TiO_2$. Intentional Supplying of an Extrinsic Stochastic Disturbance Following a Gaussian White Noise Pattern Photoelectrochemical (PEC) measurements were conducted in a commercial three-electrode quartz cell (Pine Research Instrumentation) connected to a Bio-Logic SP-300 potentiostat (EC-Lab software), provided with linear scan generator. A 0.5 M NaOH solution (250 mL) was used as electrolyte coiled Pt as counter electrode and double-junction Ag/AgCl (10% $KNO_3$ filling solution) as reference electrode. For the sake of avoiding photodegradation of the Ag/AgCl reference electrode, it was covered with Teflon tape during the experiments. A $TiO_2$-based photoanode (5.2-5.3 $cm^2$), our working electrode, was attached to an alligator clip and held in the path of the UV source. The photoelectrode was prepared by growing $TiO_2$ nanorods on a fluorine-doped tin oxide (FTO) glass substrate by a hydrothermal procedure as described elsewhere (International Journal of Hydrogen Energy, 2013, Vol. 38, 2979-2985).

A mounted UV LED was used as radiation source (385 nm, Thorlabs). In all the experiments described hereafter, the UV LED output was set to a radiation intensity of ca. 17-18 $mA/cm^2$ at $\lambda$=385 nm. The intensity was measured by means of a thermopile detector (Gentec-EO)

A LabView® (National Instruments) application was developed in order to be able to control and monitor, under the same network, the UV LED controller and the potenciostat. More importantly, LabView allowed us to introduce intentionally the extrinsic stochastic disturbance (noise signal) to the potential of the system.

This virtual instrument allowed us to perform photochemical, electrochemical or photoelectrochemical experiments.

Prior to introducing the extrinsic stochastic disturbance in the photoelectrochemical system, it was thoroughly characterized.

A three-electrode configuration was used, thus implying that the set-up measure only one half of the cell, allowing the potential of the working electrode ($E_{WE}$) to be measured without compromising the stability of that reference electrode by passing current over it. The current flows between the working electrode and the counter electrode. This configuration allows for a specific reaction to be studied with confidence and accuracy. For this reason, it is the most common set-up used in electrochemical experimentation. On the other hand, the three-electrode I-V measurement cannot be utilized to calculate power conversion efficiency because the three-electrode scale represents only the half-cell voltage between the working electrode (WE) and reference electrode (RE).

In the present case, the working electrode used in this study acted as anode (photoanode), where water molecules or oxygen-containing anions were converted to $O_2$ gas (oxidation). This half-reaction at the anode is common to both $CO_2$ reduction and water splitting processes.

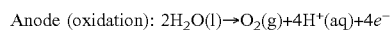

Anode (oxidation): $2H_2O(l) \rightarrow O_2(g) + 4H^+(aq) + 4e^-$

The same half reaction balanced with base:

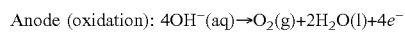

Anode (oxidation): $4OH^-(aq) \rightarrow O_2(g) + 2H_2O(l) + 4e^-$

Preliminary Electrochemical Characterization of the System:

Voltammetry experiments investigate the half-cell reactivity of the analyte, obtained by measuring the current as the potential is varied. In order to characterize our system, prior to the introduction of the extrinsic stochastic disturbance, a cyclic voltammetry (CV) is performed by cycling the potential and the cyclic voltammogram is obtained by measuring the current at the working electrode during the potential scans. The CV of the $TiO_2$ photoelectrode under UV irradiation is shown in FIG. 1, wherein the $E_{WE}$ mean values applied in the chronoamperometry experiments described hereafter are marked. Chronoamperometry is an electrochemical technique where current intensity is measured as a function of time, being potential of the working electrode the control parameter.

As observed in FIG. 1, CV follows a sigmoidal-shape pattern, and thus it corresponds to a non-linear chemical reaction, which follows a very different equation from the one that has a linear relationship despite the fact that there is a stretch of linearity in the intermediate region of the curve.

When illuminated with energy equal to or above the band gap operating potentials, minority hole carriers in n-type electrodes in aqueous solutions drive the oxygen evolution reaction (OER) at the electrode-electrolyte interface at potentials lower than that of the $O_2/H_2O$ couple. The potential at which the phenomenon begins to occur is the photocurrent onset potential ($E_{onset}$) The difference between the photocurrent onset potential and the reversible redox potential of interest ($E_0$) is the onset voltage ($V_{onset}$).

Application of the extrinsic stochastic disturbance (in this example a Gaussian White noise) to the potential difference:

Measurements introducing a particular extrinsic stochastic disturbance, Gaussian White noise, were performed on $TiO_2$ photoelectrodes. In the experiments, whose results are described hereafter, the control parameter on which the extrinsic stochastic disturbance was introduced was the working electrode potential ($E_{WE}$, V), while the monitored parameter is the resultant current intensity (I, mA). Data were registered every 0.005 s (dt).

Gaussian White noise parameters, i.e. mean value ($\mu$) and standard deviation ($\sigma$), can be modified.

The noise application interval ($\Delta t$), duration of time of one event in the noise sequence, is another parameter to be taken into account.

Figure 2:
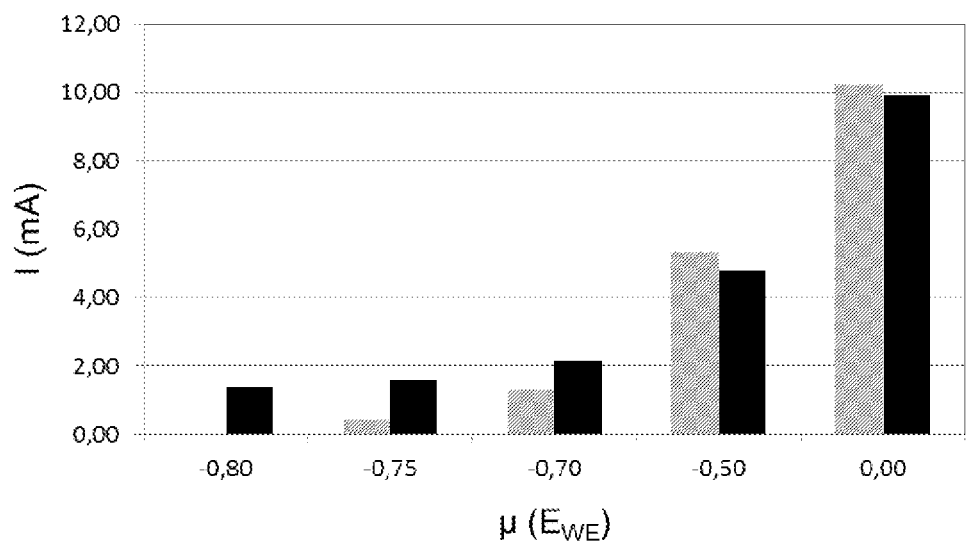
FIG. 2. Anodic current intensity mean values (I>0), registered along the chronoamperometry tests in the presence of Gaussian White noise at different μ ($E_{WE}$) for the same standard deviation (σ=0.2) and noise application interval (Δt=1 s), estimated for both the stage where an extrinsic stochastic disturbance to the potential difference (noisy potential difference) is supplied (black bars) and the stage where the stochastic disturbance to the potential difference is absent (no noisy potential difference) (patterned bars).
Figure 3A:
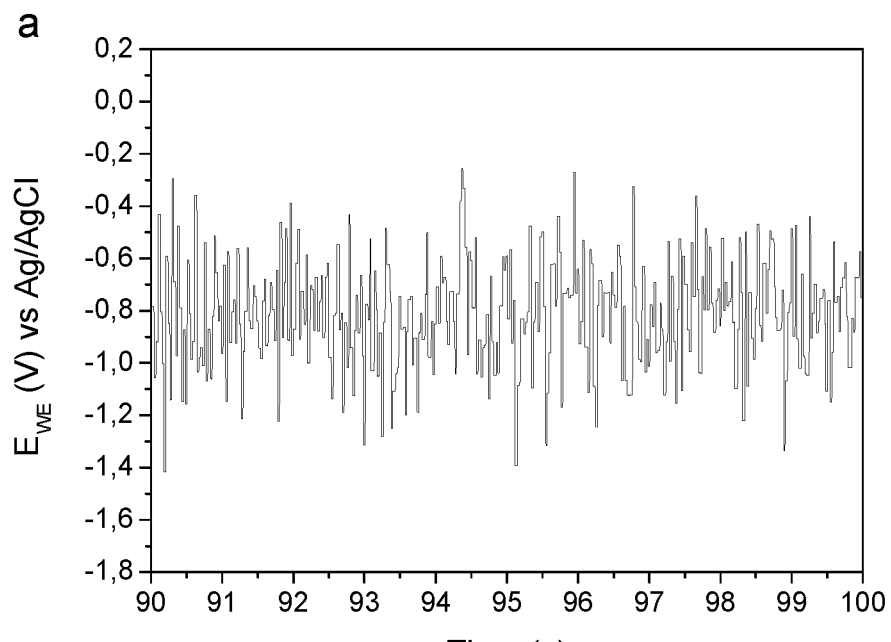
FIGS. 3A-3C. Close-up views of profiles of control parameter signal (upper) and corresponding current intensity (lower) obtained during chronoamperometry tests in the presence of Gaussian White noise with the same mean value ($E_{WE}$=−0.80V vs Ag/AgCl) and standard deviation (σ=0.2V) for three different noise signal applications intervals: a) Δt=0.01 s (FIG. 3A); b) Δt=0.1 s (FIG. 3B); c) Δt=1 s (FIG. 3C).
Figure 3A:
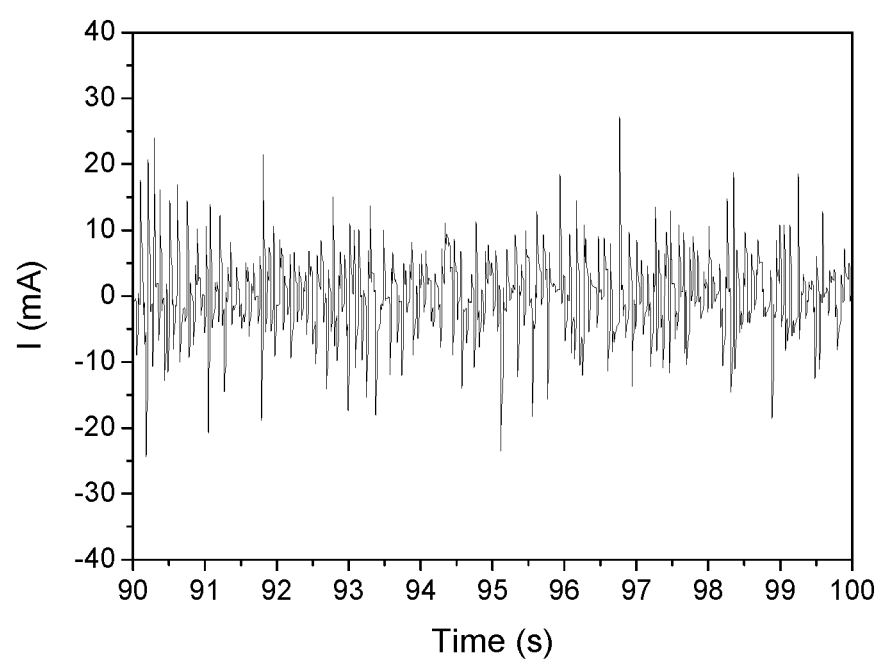
Figure 3B:
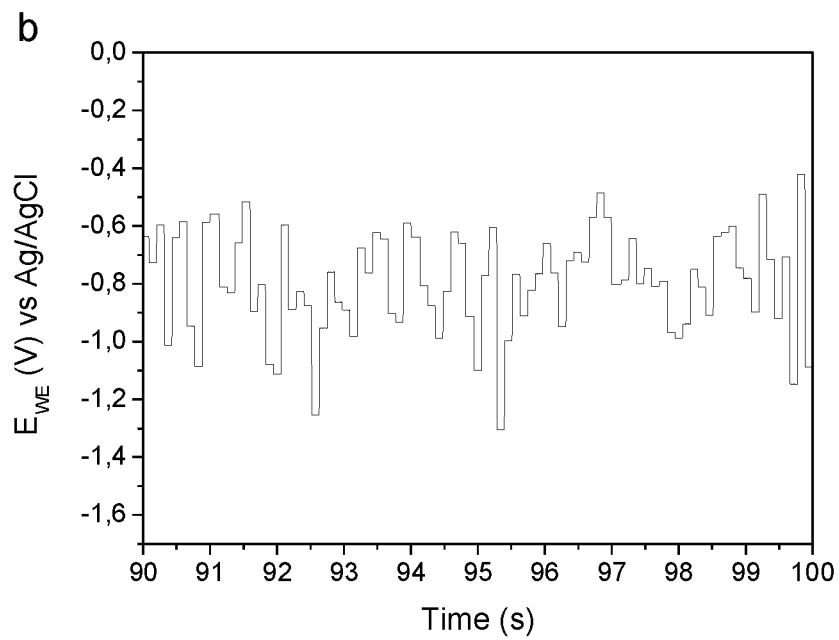
Figure 3B:
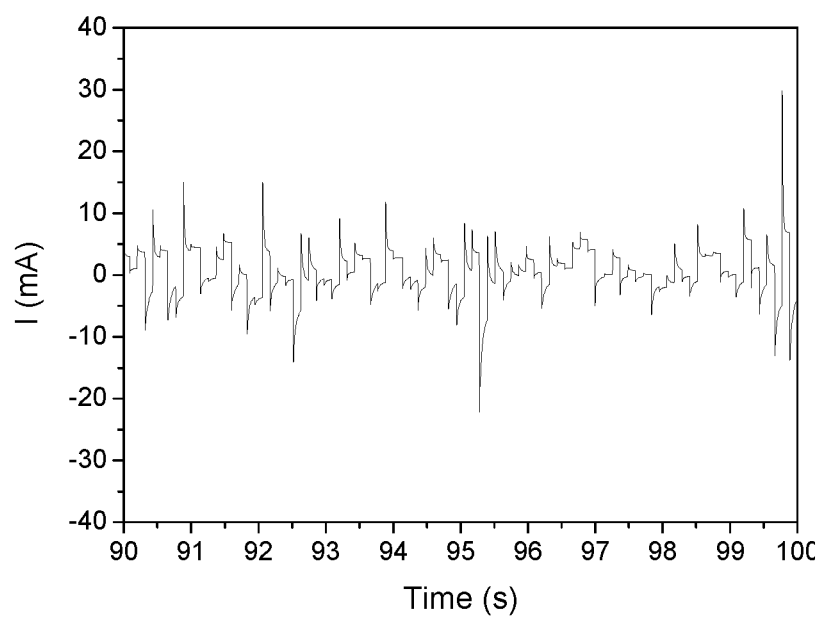
Figure 3C:
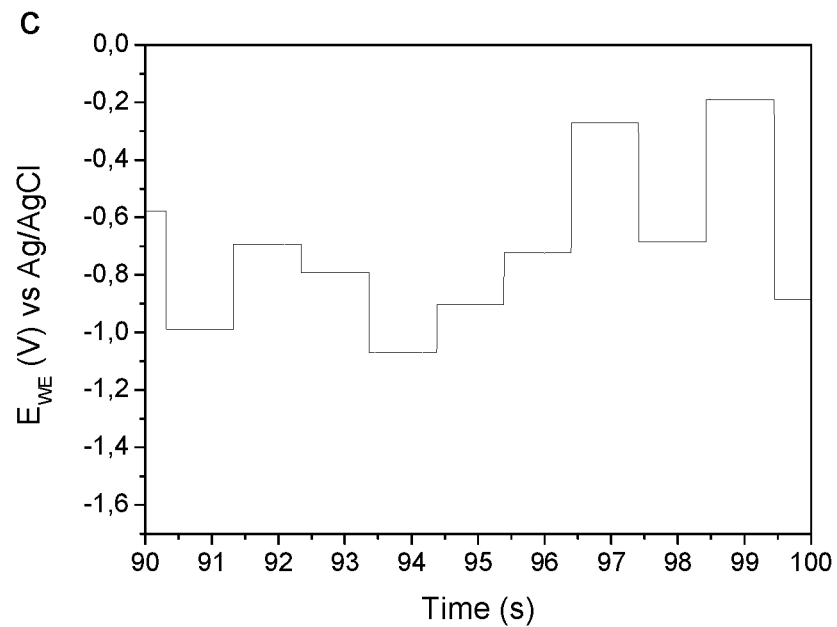
Figure 3C:
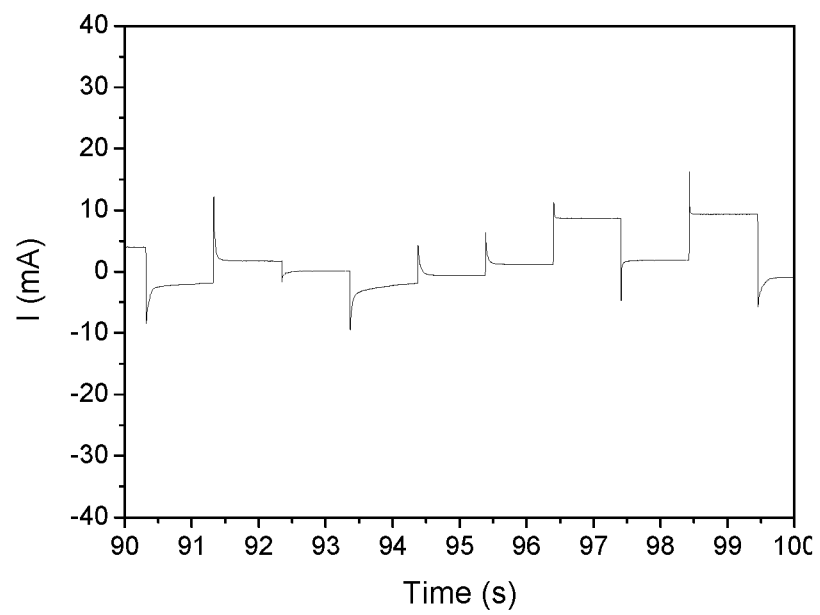

The following experimental parameters were defined:
Type of extrinsic stochastic disturbance (noise): Gaussian White Noise
Total experiment time: 310 s
  i) 1st stage: 5 s without noise
  ii) 2nd stage: 300 s with noise
    iii) 3th stage: 5 s without noise Application of the extrinsic stochastic disturbance (noise). Influence of $E_{WE}$ mean value ($\mu$) on the electrochemical response:

In order to select the targeted $E_{WE}$ range in the study, focus was placed on the CV that characterizes our photoelectrode. Mean $E_{WE}$ values ($\mu$) on the vicinity of the onset potential in the I-V curve of the photoanode under irradiation were selected ($E_{onset} \approx -0.80$ V vs Ag/AgCl). Experiments in the presence of Gaussian White noise were performed at different $\mu$ ($E_{WE}$) near the observed $E_{onset}$ for the same standard deviation ($\sigma$=0.3) and noise application interval ($\Delta t$=1 s) (FIG. 2). In order to facilitate the analysis of the results from different experiments, anodic current intensity mean values (I>0), registered along the chronoamperometry tests, were estimated both during periods when the extrinsic stochastic disturbance is applied (noise) and in absence of the extrinsic stochastic disturbance (no-noise) stages (FIG. 2)

Focusing on the no-noise stages (steady state values), an increment in the current intensity when moving to less negative potentials is observed, as could be expected from a photoanode; positive current intensity values are obtained only for $E_{WE} \geq E_{onset}$.

Application of the extrinsic stochastic disturbance (noise): Influence of noise application interval ($\Delta t$) on the electrochemical response:

The influence of noise signal application interval has been explored for a fixed mean value $\mu$ ($E_{WE}$=-0.80V vs Ag/AgCl) and standard deviation, $\sigma$=0.2V. Close-up views of profiles of control parameter signal and corresponding obtained current intensity profiles for three different noise signal applications intervals are shown: a) Δt=0.01 s; b) Δt=0.1 s; c) Δt=1 s (c.f. 3)

Figure 4A:
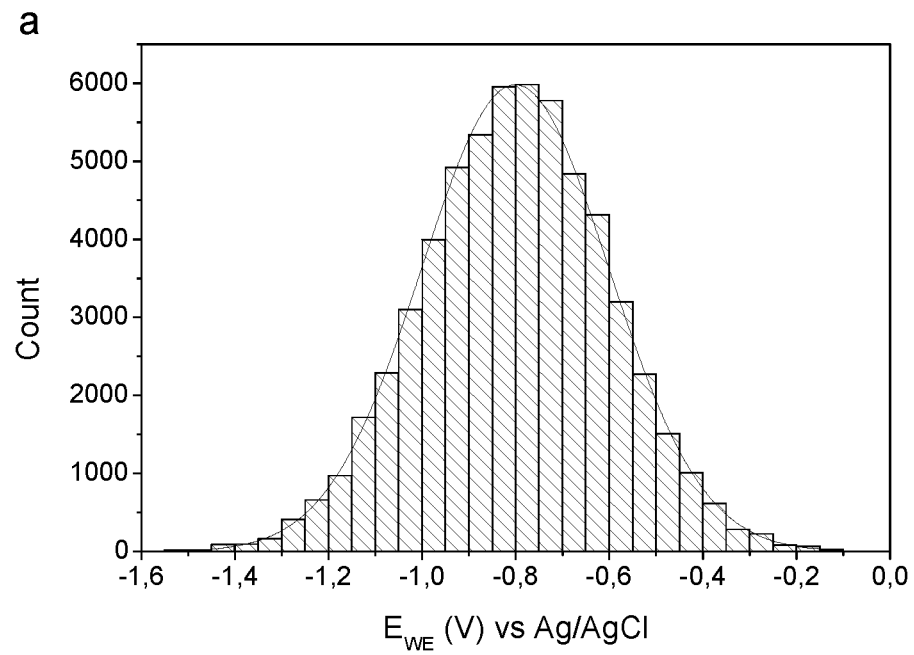
FIGS. 4A-4C. Histograms showing distributions of the control parameter values (upper, $E_{WE}$) and the corresponding monitored signal (lower, current intensity) for chronoamperometry tests in the presence of Gaussian White noise, with the same mean value μ ($E_{WE}$=−0.80V vs Ag/AgCl) and standard deviation (σ=0.2V) for three different Δt: a) Δt=0.01 s (FIG. 4A); b) Δt=0.1 s (FIG. 4B); c) Δt=1 s (FIG. 4C).
Figure 4A:
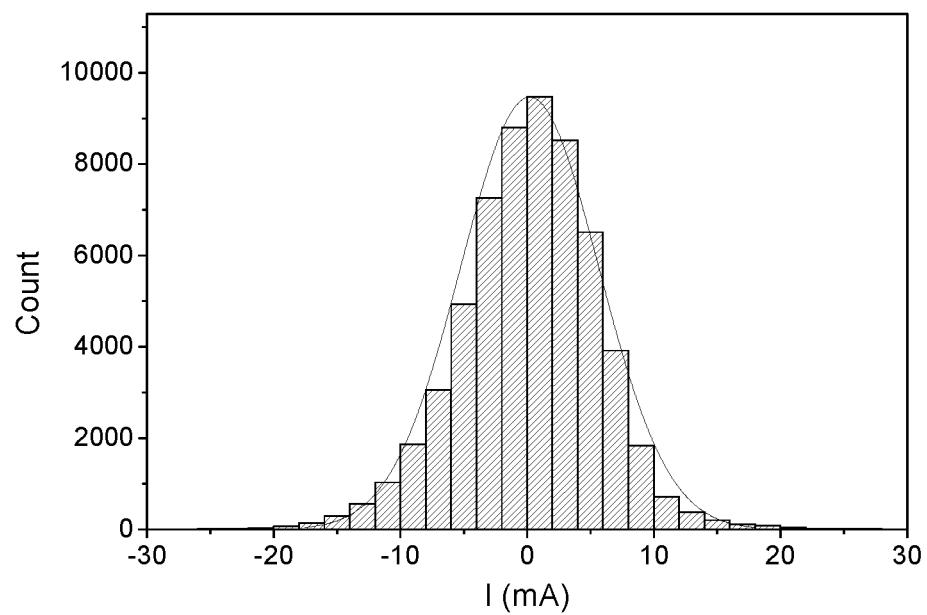
Figure 4B:
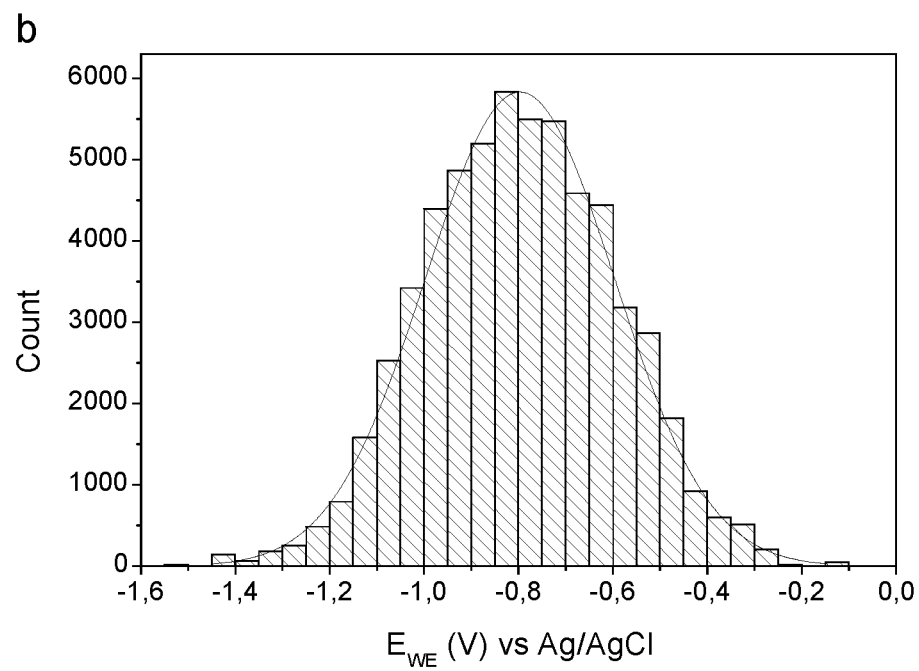
Figure 4B:
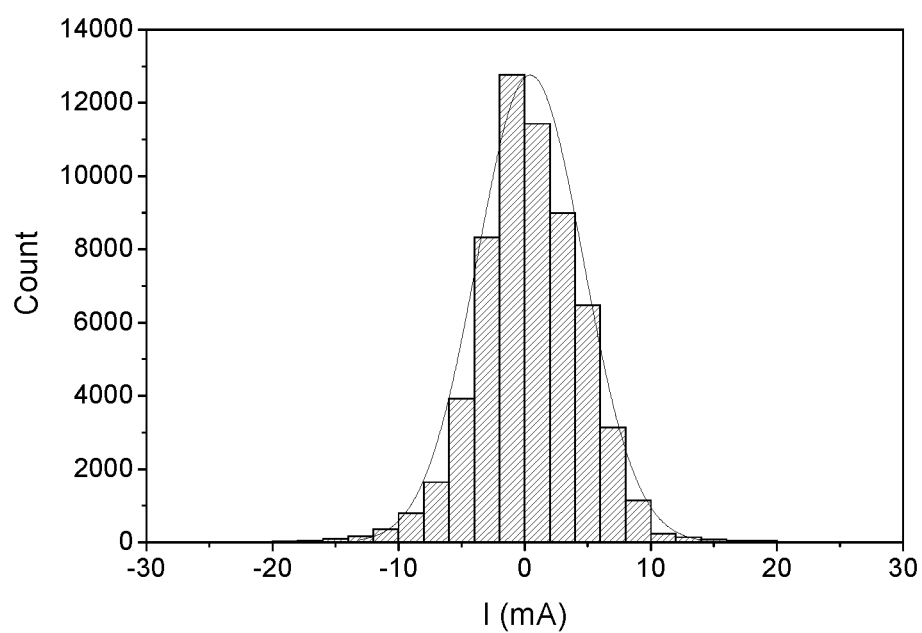
Figure 4C:
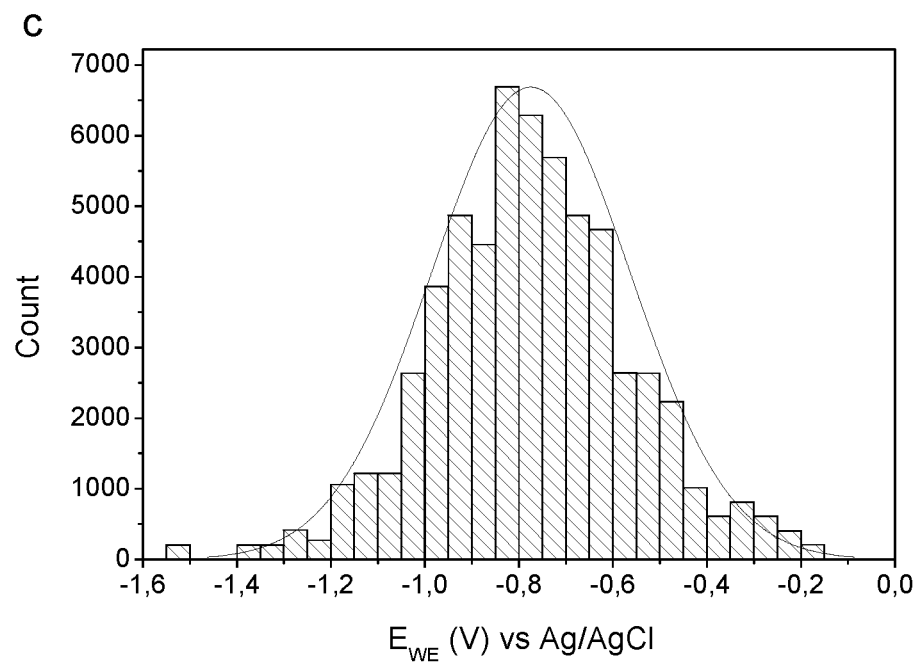
Figure 4C:
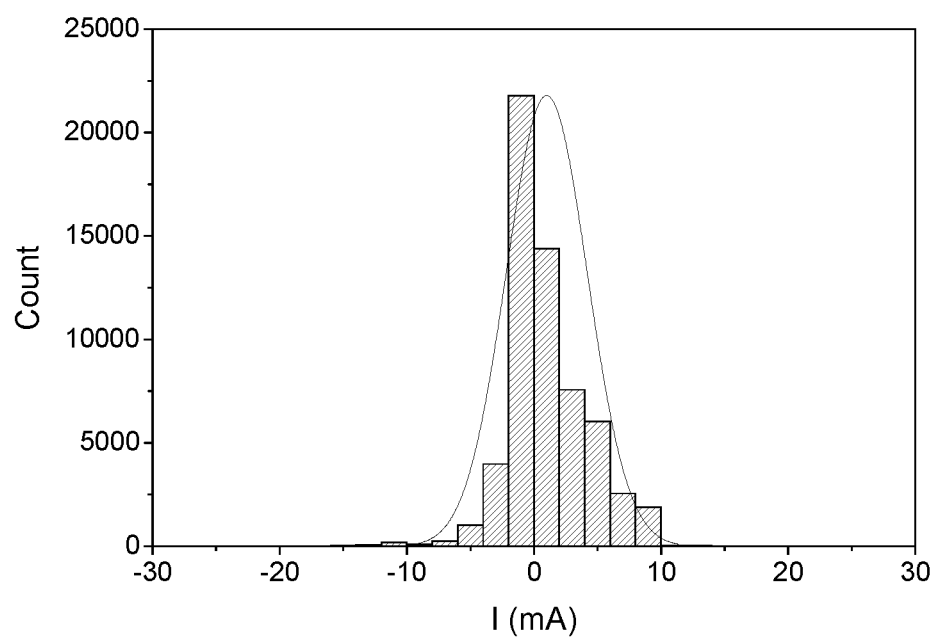

Histograms showing distributions of the control parameter values ($E_{WE}$) and the corresponding monitored signal (current intensity) are presented in FIGS. 4A-4C for the three different Δt for a fixed mean value μ ($E_{WE}$=−0.80V vs Ag/AgCl) and standard deviation, σ=0.2V: a) Δt=0.01 s (FIG. 4A); b) Δt=0.1 s (FIG. 4B); c) Δt=1 s (FIG. 4C).

It has to be taken into account the reduced number of values as Δt gets higher, as clearly reflected in the $E_{WE}$ histograms. In any case, it is also evident that as Δt increases, the current intensity histogram losses the symmetry, being data for Δt=1 s clearly skewed to the right, to positive current intensity values, minimizing the presence of negative current intensity values.

Figure 5:
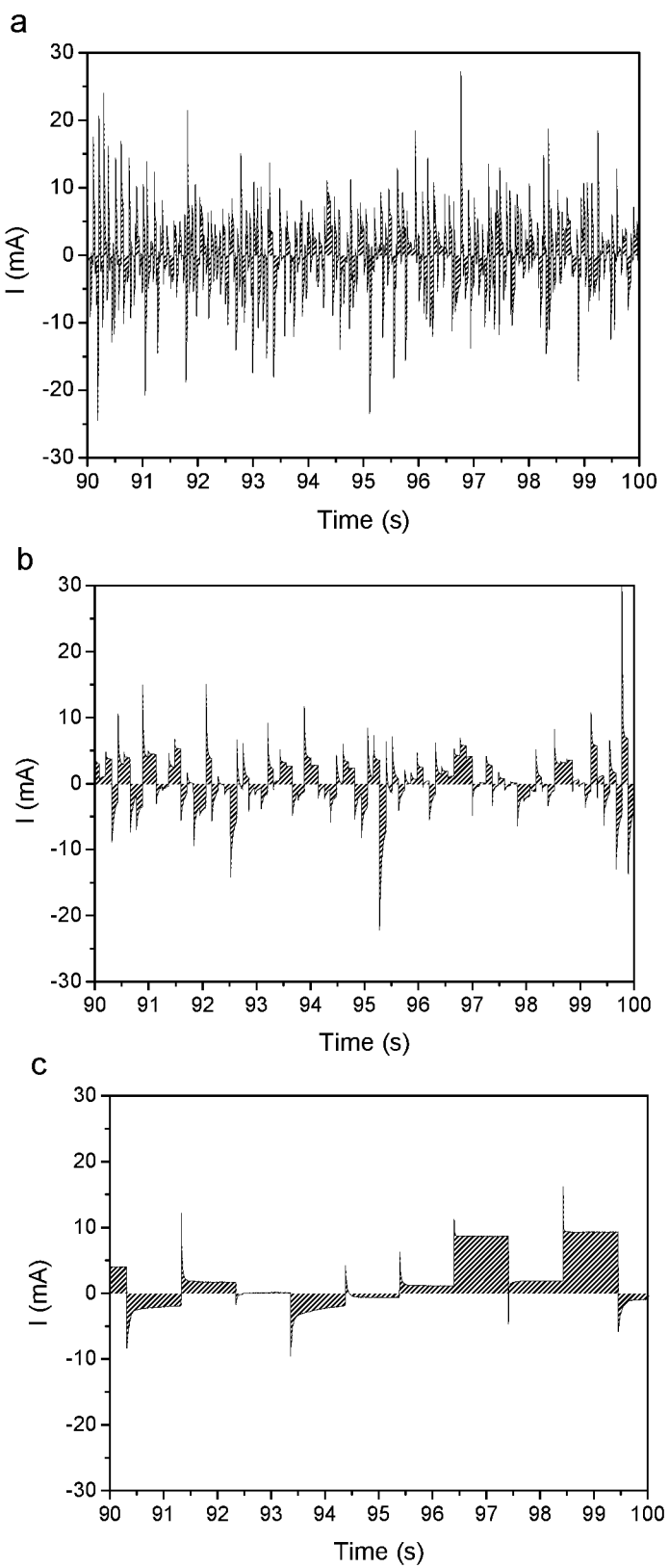
FIG. 5. Close-up views of current intensity profiles showing the integration of the curve for the estimation of the accumulated charge (Q, mC=mA×s) in the chronoamperometry tests in the presence of Gaussian White noise for a fixed mean value μ ($E_{WE}$=−0.80V vs Ag/AgCl) and standard deviation (α=0.2V), for three different Δt: a) Δt=0.01 s; b) Δt=0.1 s; c) Δt=1 s.

We can also estimate the charge accumulated in each experiment (Q, mC=mA s), from the integration of the current Intensity versus time curve. Close-up views of these integrated signals are presented in FIG. 5 for a fixed mean value μ ($E_{WE}$=−0.80V vs Ag/AgCl) and standard deviation (σ=0.2V), and three different Δt: a) Δt=0.01 s; b) Δt=0.1 s; c) Δt=1 s. Besides total Q, $Q_{charge}$ (I>0) and $Q_{discharge}$ (I<0) values have also been estimated.

We can go farther, by differentiating $Q_{charge}$ (charge passed during oxidation, I>0) from $Q_{discharge}$ (charge passed during reduction, I<0.

|  | Δt = 0.01 s | Δt = 0.1 s | Δt = 1 s |
| --- | --- | --- | --- |
| Q total | +60.29 | 131.5 | 302.3 |
| QI > 0 | +660.8 | 546.5 | 505.3 |
| QI < 0 | −601.2 | −405.0 | −203.7 |

The table above contains the Q values in milicoulombs (mC=1 mA s). In all cases, Q values at this $E_{WE}$ are 0 in the absence of the extrinsic stochastic disturbance (noise). It can be observed that despite absolute numbers for $Q_{charge}$ and $Q_{discharge}$ decreases with Δt (from 0.01 to 1 s), total Q increases, due to the sharper decrease experienced by $Q_{discharge}$.

In this example, it can be concluded that increasing Δt from the millisecond (ms) to the second range (s) has a positive effect on the photoanode response.

Application of the extrinsic stochastic disturbance (noise). Influence of standard deviation of noise (a) on the electrochemical response:

The influence of standard deviation of Gaussian White Noise, ranging from 0.2 to 0.4, has also been explored for a fixed mean value μ ($E_{WE}$=−0.80V vs Ag/AgCl) and noise application internal (Δt=1 s). A maximum was observed for σ=0.3.

Example 2. Oxidation of Methylene Blue (MB) on $TiO_2$. Intentional Supplying of an Extrinsic Stochastic Disturbance Following Different Patterns Photoelectrochemical (PEC) measurements were conducted in a three-electrode quartz cell connected to a Bio-Logic SP-300 potentiostat, provided with linear scan generator. A 0.1 M $K_2SO_4$ solution (50 mL) was used as electrolyte, coiled Pt as counter electrode and double-junction Ag/AgCl (10% $KNO_3$ filling solution) as reference electrode. The $TiO_2$-based photoanode (2.2 cm$^2$), our working electrode, was attached to an alligator clip and held in the path of the UV light source. For the sake of avoiding photodegradation of the Ag/AgCl reference electrode, it was covered with Teflon tape during the experiments. 0.005 g/L of methylene blue was added to the electrolyte.

A mounted UV LED was used as radiation source (385 nm, Thorlabs). In the experiments under irradiation described hereafter, the UV LED output was set to a radiation intensity of ca. 17-18 mA/cm$^2$ at λ=385 nm. The intensity was measured by means of a thermopile detector (Gentec-EO).

The UV LED controller and the potenciostat were controlled and monitored via an ad-hoc developed LabView application from National Instruments Spain. More importantly, LabVIEW allow us to introduce the noise signal in the system.

A three-electrode configuration was used, thus implying that the set-up measure only half-cell reactivity, allowing the potential of the working electrode ($E_{WE}$) to be measured without compromising the stability of that reference electrode by passing current over it. The current flows between the working electrode and the counter electrode.

In the present case, the working electrode used in this study acts as anode (photoanode), in whose surface the oxidation reaction of the target molecule takes place.

Figure 6:
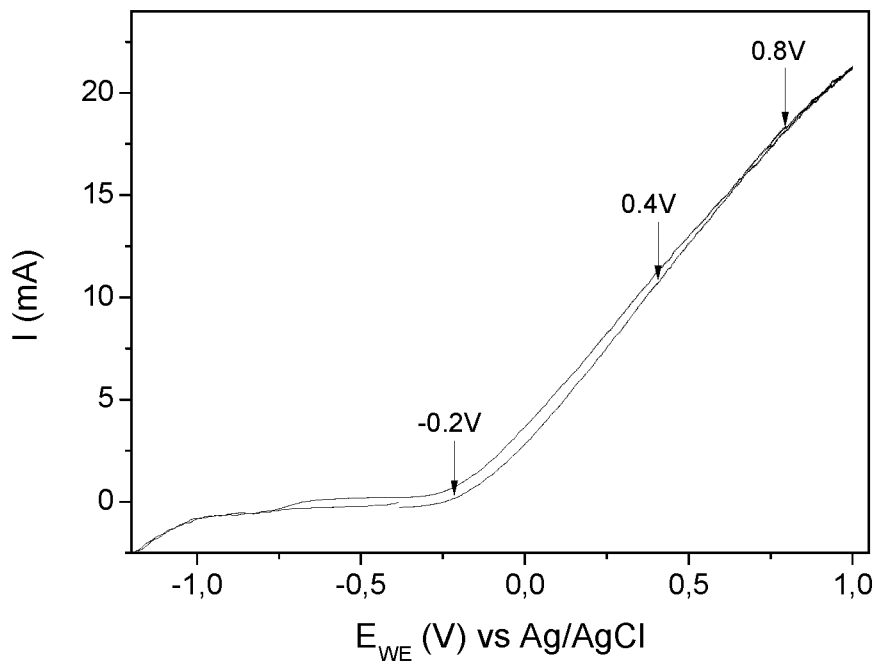
FIG. 6. Cyclic voltammetry under UV irradiation of the $TiO_2$ photoanode in 0.1M $K_2SO_4$, in the presence of methylene blue (0.005 g/L). The arrows mark the $E_{WE}$ values applied in the chronoamperometry tests.

For the sake of characterizing the system, the cyclic voltammetry of the photoelectrode in the electrolyte, in the presence of the organic compound, is presented in FIG. 6, wherein the arrows mark the $E_{WE}$ values applied in the experiments described hereafter.

The oxidation reactions were conducted under potentiostatic conditions, where current is measured as a function of time (dt=1 s). Methylene blue (MB) concentration was quantified by UV-Vis spectroscopy, analyzing the peak at λ=664 nm.

Figure 7:
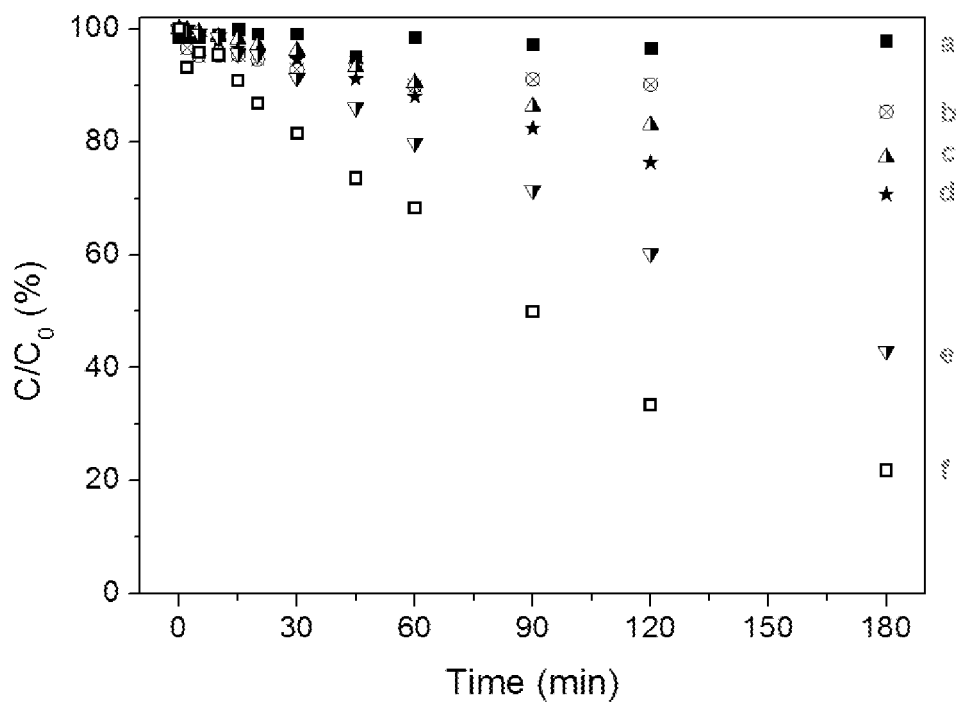
FIG. 7. Evolution of methylene blue concentration (%) at different reaction conditions in the absence of the supplied extrinsic stochastic disturbance: a) UV; b) UV+$TiO_2$; c) $TiO_2$+$E_{WE}$ (−0.2V vs Ag/AgCl); d) UV+$TiO_2$+$E_{WE}$ (−0.2V vs Ag/AgCl); e) UV+$TiO_2$+$E_{WE}$ (+0.4V vs Ag/AgCl); f) UV+$TiO_2$+$E_{WE}$ (+0.8V vs Ag/AgCl).

FIG. 7 shows the MB oxidation in the absence of the intentionally supplied extrinsic stochastic disturbance (noise) at different conditions: a) only UV; b) UV+$TiO_2$; c) $TiO_2$+$E_{WE}$ (−0.2V vs Ag/AgCl); d) UV+$TiO_2$+$E_{WE}$ (−0.2V vs Ag/AgCl); e) UV+$TiO_2$+$E_{WE}$ (+0.4V vs Ag/AgCl); f) UV+$TiO_2$+$E_{WE}$ (+0.8V vs Ag/AgCl). Experiments a, b and c were carried out as blanks of the reaction.

Figure 8:
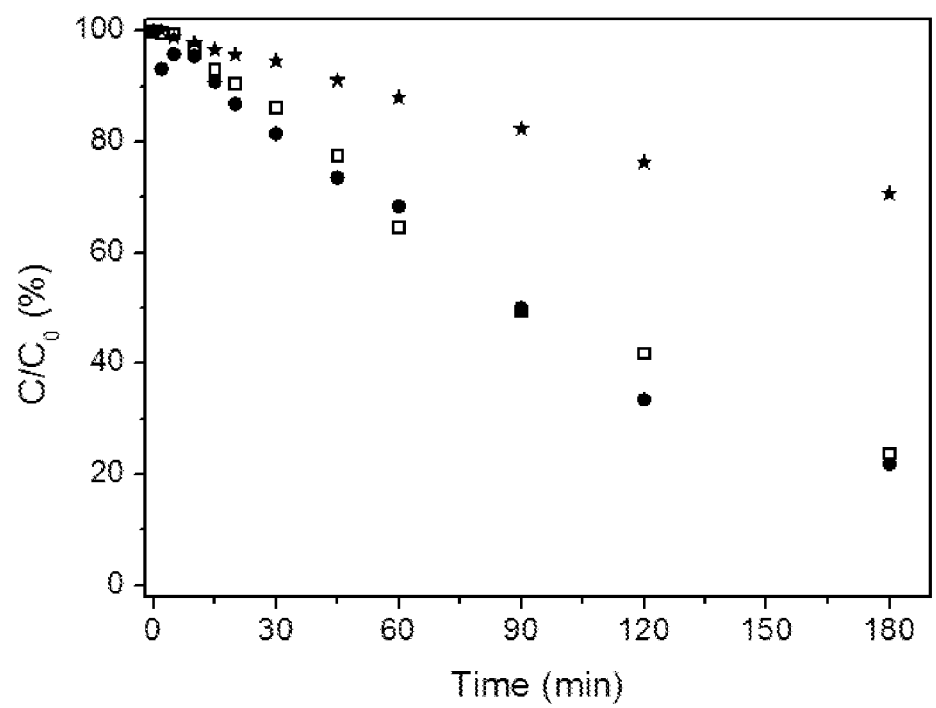
FIG. 8. Evolution of methylene blue concentration (%) during oxidation on $TiO_2$ photoelectrode under UV irradiation, applying a working electrode potential $E_{WE}$=−0.2V vs Ag/AgCl in the absence of the supplied extrinsic stochastic disturbance (stars), $E_{WE}$=0.8V vs Ag/AgCl also in the absence of the supplied extrinsic stochastic disturbance (circles), and applying Gaussian White Noise in $E_{WE}$, with μ ($E_{WE}$)=0.2V, σ=0.3, Δt=1 s (squares).

FIG. 8 shows the MB oxidation introducing Gaussian White Noise in $E_{WE}$, with μ ($E_{WE}$)=−0.2V vs Ag/AgCl, σ=0.3, Δt=1 s (represented by squares)→C/$C_0$=24% at t=180 min (76% of initial MB oxidized after 3 h). Equivalent results in the absence of the intentionally supplied extrinsic stochastic disturbance are presented in the same graph for comparative reasons (stars). MB oxidation at $E_{WE}$=0.8V vs Ag/AgCl in the absence of the intentionally supplied extrinsic stochastic disturbance is also included (represented by circles)→C/$C_0$=22% at t=180 min (78% of initial MB oxidized after 3 h).

Figure 9:
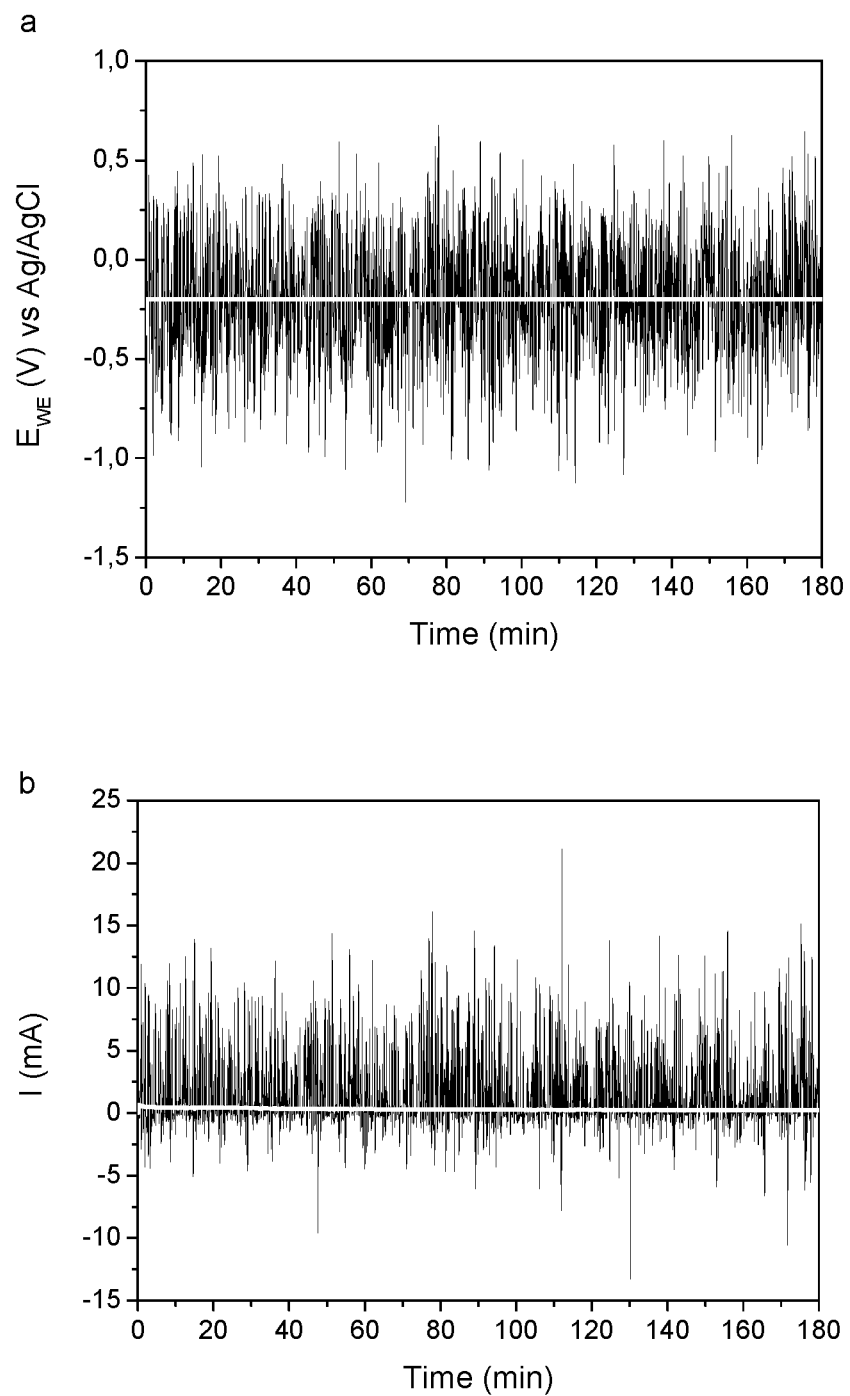
FIG. 9. Working electrode potential (a) and current intensity (b) evolution, both in the absence of the supplied extrinsic stochastic disturbance (white lines) and in the presence of Gaussian White noise (black lines).

In FIG. 9, working electrode potential (a) and current intensity evolution (b) with time is presented for both reactions conditions, in the absence of the intentionally supplied extrinsic stochastic disturbance (white lines) and presence of Gaussian White noise (black lines). Average values of current intensity are calculated. In the absence of the intentionally supplied extrinsic stochastic disturbance, current intensity is 0.3 mA. In the case of the current intensity value obtained in the presence of the intentionally supplied extrinsic stochastic disturbance, the total average current intensity is 1.6 mA, while the average positive current intensity (anodic current, considering only I>0) is 3.4.

It is evident that the introduction of an extrinsic stochastic disturbance signal in the working electrode potential difference is leading to an increased current intensity and consequently to a higher MB oxidation degree. MB degradation rate at higher anodic potentials, e.g. at $E_{WE}$=0.4V vs Ag/AgCl, is lower than that in the presence of the intentionally supplied extrinsic stochastic disturbance at $\mu(E_{WE})$=−0.2V vs Ag/AgCl.

Figure 10:
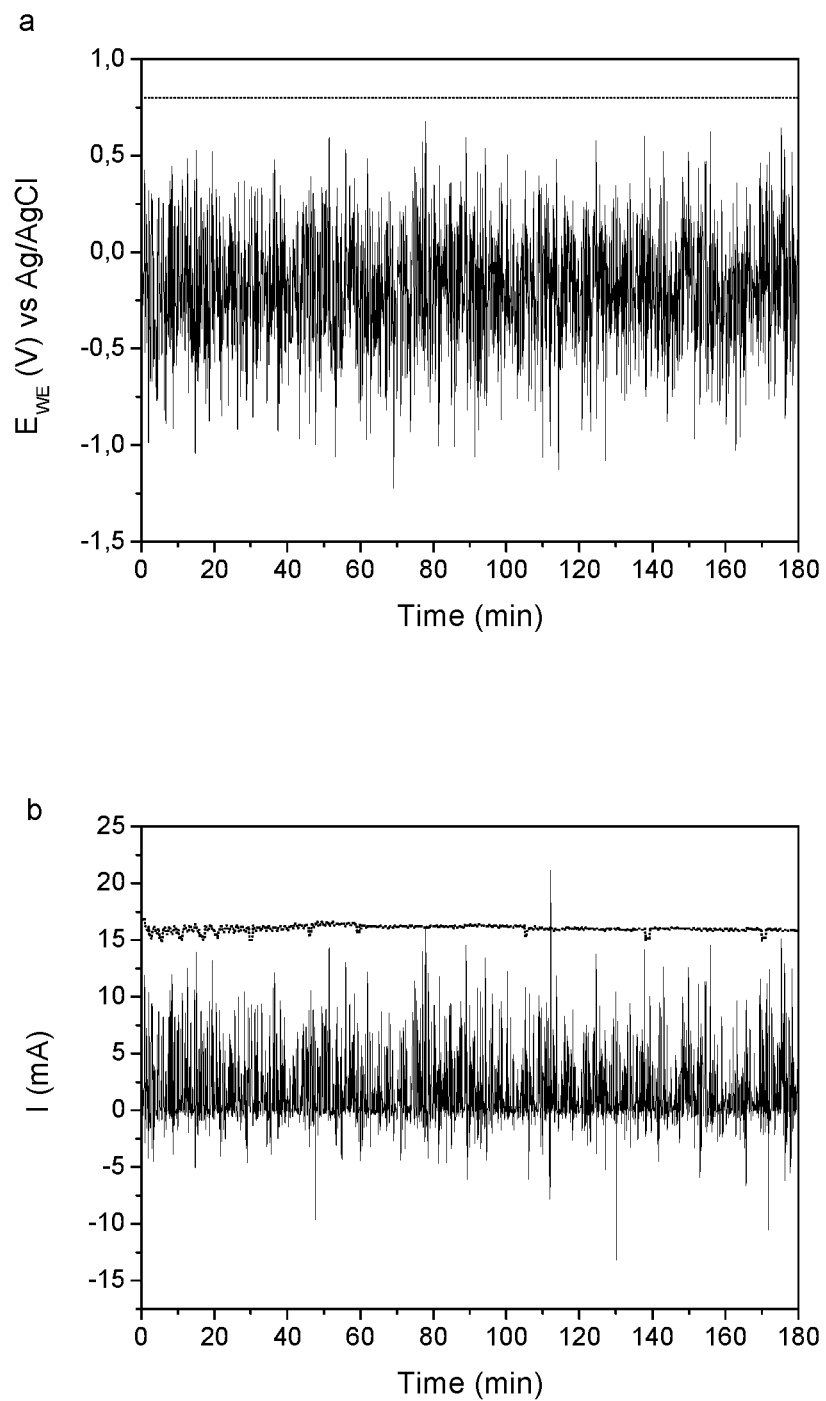
FIG. 10. Working electrode potential (a) and current intensity (b) evolution for both the reaction at $E_{WE}$=0.8V vs Ag/AgCl in the absence of the supplied extrinsic stochastic disturbance (dot line) and for reaction in the presence of Gaussian White noise at μ ($E_{WE}$)=−0.2V vs Ag/AgCl (straight line).

Working electrode potential (a) and current intensity evolution (b) with time is presented in FIG. 10 for both reactions conditions (dot line for the reaction at $E_{WE}$=0.8V vs Ag/AgCl in the absence of the extrinsic stochastic disturbance and straight line for the reaction in the presence of Gaussian white noise at $\mu$ ($E_{WE}$)=−0.2V vs Ag/AgCl). Average values of current intensity are calculated. In the absence of the intentionally supplied extrinsic stochastic disturbance, current intensity is 16 mA. In the case of the current intensity value obtained in the presence of the extrinsic stochastic disturbance, the total average current intensity is 1.6 mA, while the average positive current intensity (anodic current, considering only I>0) is 3.4.

Some experiments were also performed in a 250 mL cell. Nevertheless, efficiencies were considerably lower than in the 50 mL cell which can be ascribed to the different electrode surface area vs electrolyte volume since electrode size was kept constant.

Figure 11:
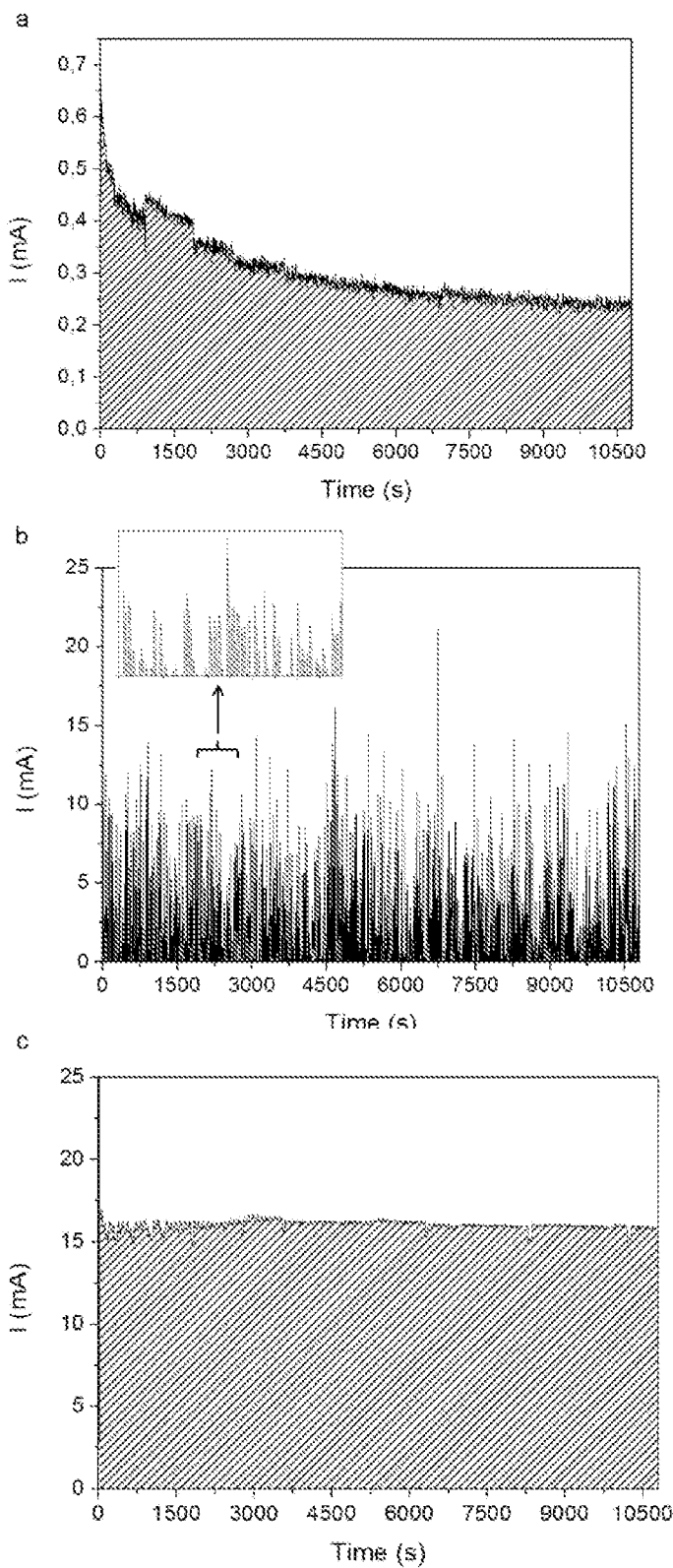
FIG. 11. Integration of the I-t curve for the estimation of the accumulated charge over a period of time (1 mC=1 mA×s). Estimations of the anodic current (I>0) accumulated during the 3 h experiments are shown, represented by the area under the I-t curves: a) at $E_{WE}$=−0.2V vs Ag/AgCl in the absence of the supplied extrinsic stochastic disturbance; b) in the presence of Gaussian white noise at μ ($E_{WE}$)=−0.2V vs Ag/AgCl, inlet showing a detail of the integrated area under the curve; and c) at $E_{WE}$=0.8V vs Ag/AgCl in the absence of the supplied extrinsic stochastic disturbance.

FIG. 11 shows the integration of the I-t curve leads to an estimation of the accumulated charge over a period of time (1 mC=1 mA s). Estimations of the anodic current (I>0) accumulated during the 3 h experiments are shown, represented by the area under the I-t curves: a) at $E_{WE}$=−0.2V vs Ag/AgCl in the absence of the intentionally supplied extrinsic stochastic disturbance→Q (I>0)≈3267 mC; b) in the presence of Gaussian white noise at $\mu$ ($E_{WE}$)=−0.2V vs Ag/AgCl, inlet showing a detail of the integrated area under the curve→Q (I>0)≈21040 mC; c) at $E_{WE}$=0.8V vs Ag/AgCl in the absence of the extrinsic stochastic disturbance→Q (I>0)≈173000 mC.

Figure 12A:
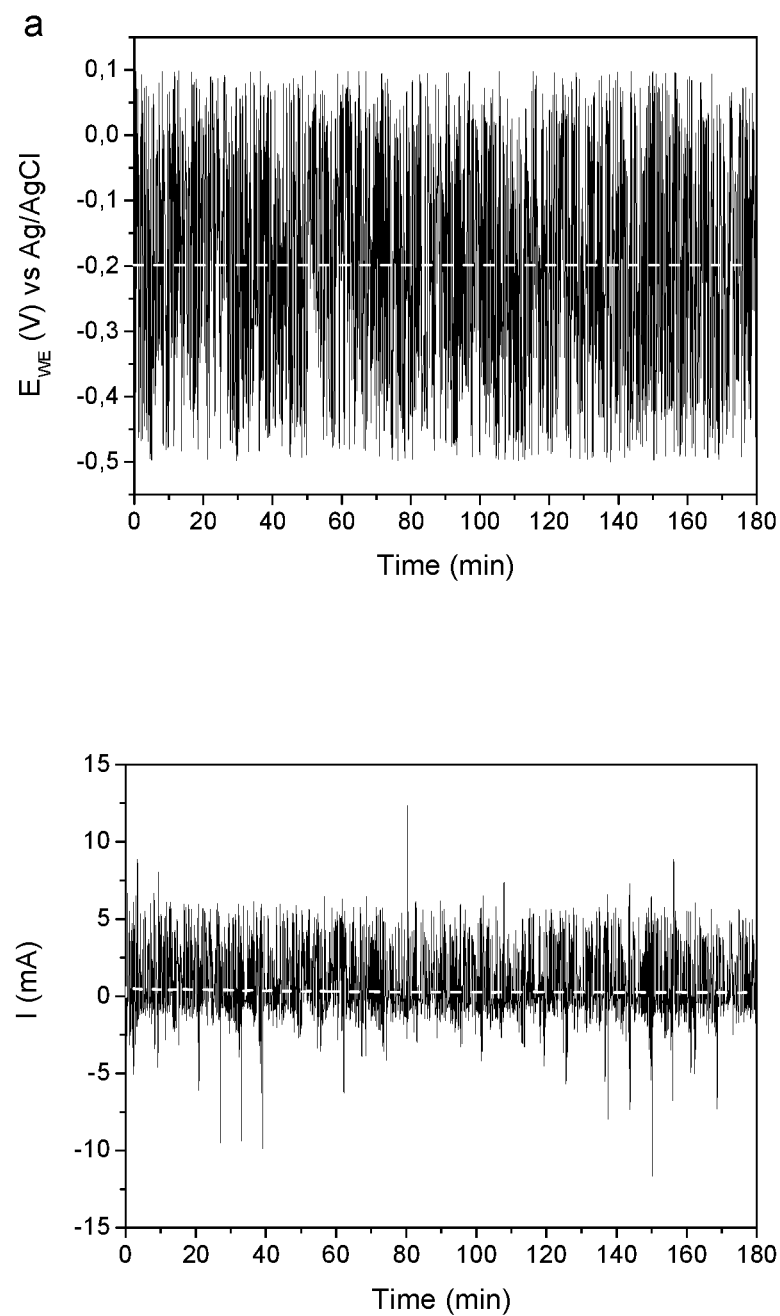
FIGS. 12A-12B. Profiles of $E_{WE}$ signals modified by different types of the supplied extrinsic stochastic disturbance and the corresponding registered current intensity signals: a) Constant white noise (amplitude=0.3)(FIG. 12A), b) Pink noise (amplitude=0.8)(FIG. 12B). Dashed lines represent profiles in the absence of the supplied extrinsic stochastic disturbance.
Figure 12B:
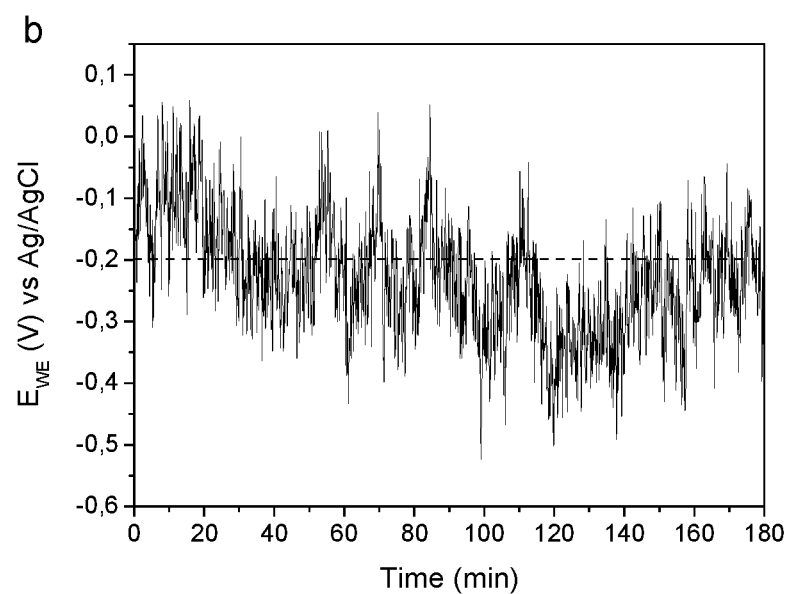
Figure 12B:
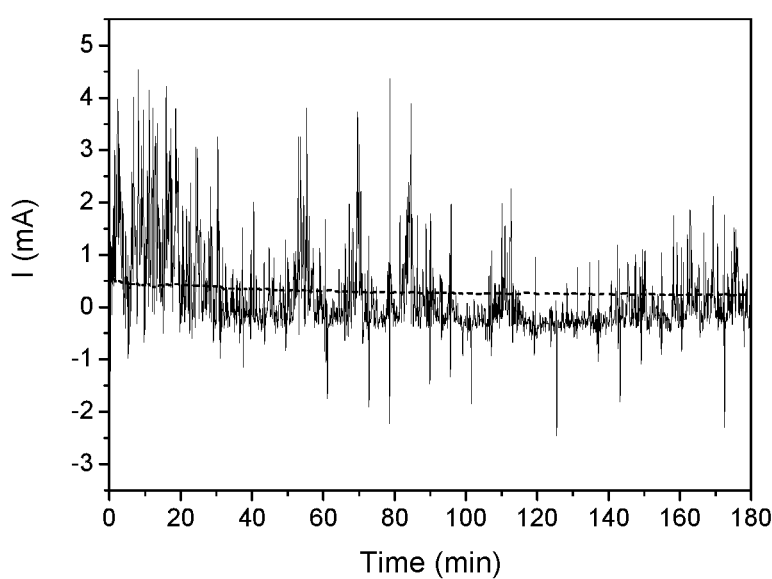

FIG. 12 shows the profiles of $E_{WE}$ signals modified by different types of the intentionally supplied extrinsic stochastic disturbance and the corresponding registered current intensity signals: a) Constant White noise (amplitude=0.3); b) Pink noise (amplitude=0.8). Dashed lines represent profiles in the absence of the intentionally supplied extrinsic stochastic disturbance.

Analogous profiles for Gaussian White noise are shown in FIGS. 10 and 11.

Figure 13:
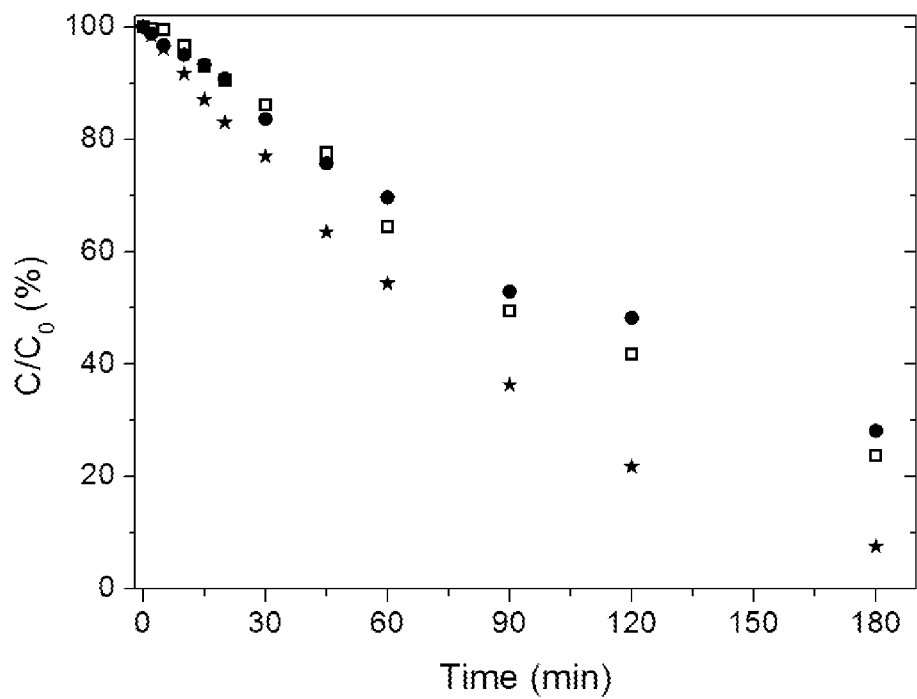
FIG. 13. Evolution of methylene blue concentration (%) during oxidation on $TiO_2$ photoelectrode under UV irradiation and applying Gaussian White noise in $E_{WE}$, with μ ($E_{WE}$)=0.2V vs Ag/AgCl, σ=0.3, Δt=1 s (represented by squares); Constant White noise, with μ ($E_{WE}$)=0.2V vs Ag/AgCl, amplitude=0.3, Δt=1 s (represented by stars); and Pink noise, with μ ($E_{WE}$)=0.2V vs Ag/AgCl, amplitude=0.8, Δt=1 s (represented by circles).

FIG. 13 shows the MB oxidation introducing Gaussian White Noise in $E_{WE}$, with $\mu$ ($E_{WE}$)=−0.2V vs Ag/AgCl, $\sigma$=0.3, $\Delta t$=1 s (represented by squares)→$C/C_0$=24% at t=180 min (76% of initial MB oxidized after 3 h); MB oxidation introducing Constant White Noise in $E_{WE}$, with $\mu$ ($E_{WE}$)=−0.2V vs Ag/AgCl, amplitude=0.3, $\Delta t$=1 s (represented by stars)→$C/C_0$=8% at t=180 min (92% of initial MB oxidized after 3 h); and MB oxidation introducing Pink noise in $E_{WE}$, with $\mu$ ($E_{WE}$)=−0.2V vs Ag/AgCl, amplitude=0.8, $\Delta t$=1 s (represented by circles)→$C/C_0$=28% at t=180 min (72% of initial MB oxidized after 3 h)

Example 3. Hydrogen Evolution Reaction (HER) on Si-Based Photoelectrodes. Intentional Supplying of an Extrinsic Stochastic Disturbance Following Different Patterns Photoelectrochemical (PEC) measurements were conducted in a three-electrode quartz cell connected to a Bio-Logic SP-300 potentiostat, provided with linear scan generator. A 0.5 M $H_2SO_4$ solution (50 mL) was used as electrolyte, coiled Pt as counter electrode and Ag/AgCl (saturated KCl) as reference electrode. The silicon-based photoelectrode used as working electrode was attached to an alligator clip and held in the path of the light source. For the sake of avoiding photodegradation of the Ag/AgCl reference electrode, it was covered with Teflon tape during the experiments.

A solar simulator equipped with a AM 1.5G filter (Solar Light, model 16S-300), situated at an appropriate distance to provide 100 mW/cm², was used as radiation source.

In the present case, the working electrode used in this example acts as cathode (photocathode), where at the studied conditions water molecules are reduced to $H_2$ gas (reduction). The photocathode preparation procedure is described in reference ACS Appl. Mater. Interfaces 2017, 9, 17932-17941.

The potenciostat was controlled and monitored via an ad-hoc developed LabView application from National Instruments Spain in order to be able to introduce the noise signal in the system.

A three-electrode configuration was used, thus implying that the set-up measure only half-cell reactivity, allowing the potential of the working electrode ($E_{WE}$) to be measured without compromising the stability of that reference electrode by passing current over it. The current flows between the working electrode and the counter electrode.

Figure 14:
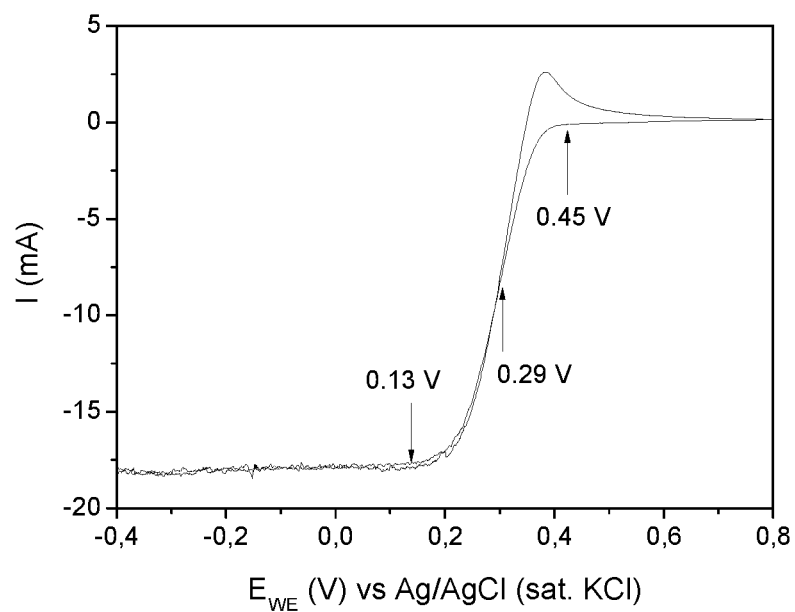
FIG. 14. Cyclic voltammetry of the Si-based photocathode in 0.5M $H_2SO_4$ under simulated solar light. The three different $E_{WE}$ values applied in the chronoamperometry tests are marked with arrows.

It is worth reminding that cathodic current is represented by negative values. For the sake of characterizing the system, the cyclic voltammetry of the photoelectrode in the electrolyte is presented in FIG. 14, wherein arrows mark the $E_{WE}$ values applied in the chronoamperometry experiments described hereafter.

Experiments total time was 310 s in all cases: 1st stage of 10 s without the intentional supplying of an extrinsic stochastic disturbance; 2nd stage of 300 s with the intentional supplying of an extrinsic stochastic disturbance; and 3rd stage of 10 s without the intentional supplying of the extrinsic stochastic disturbance. Data were registered every 0.005 s (dt).

Figure 15:
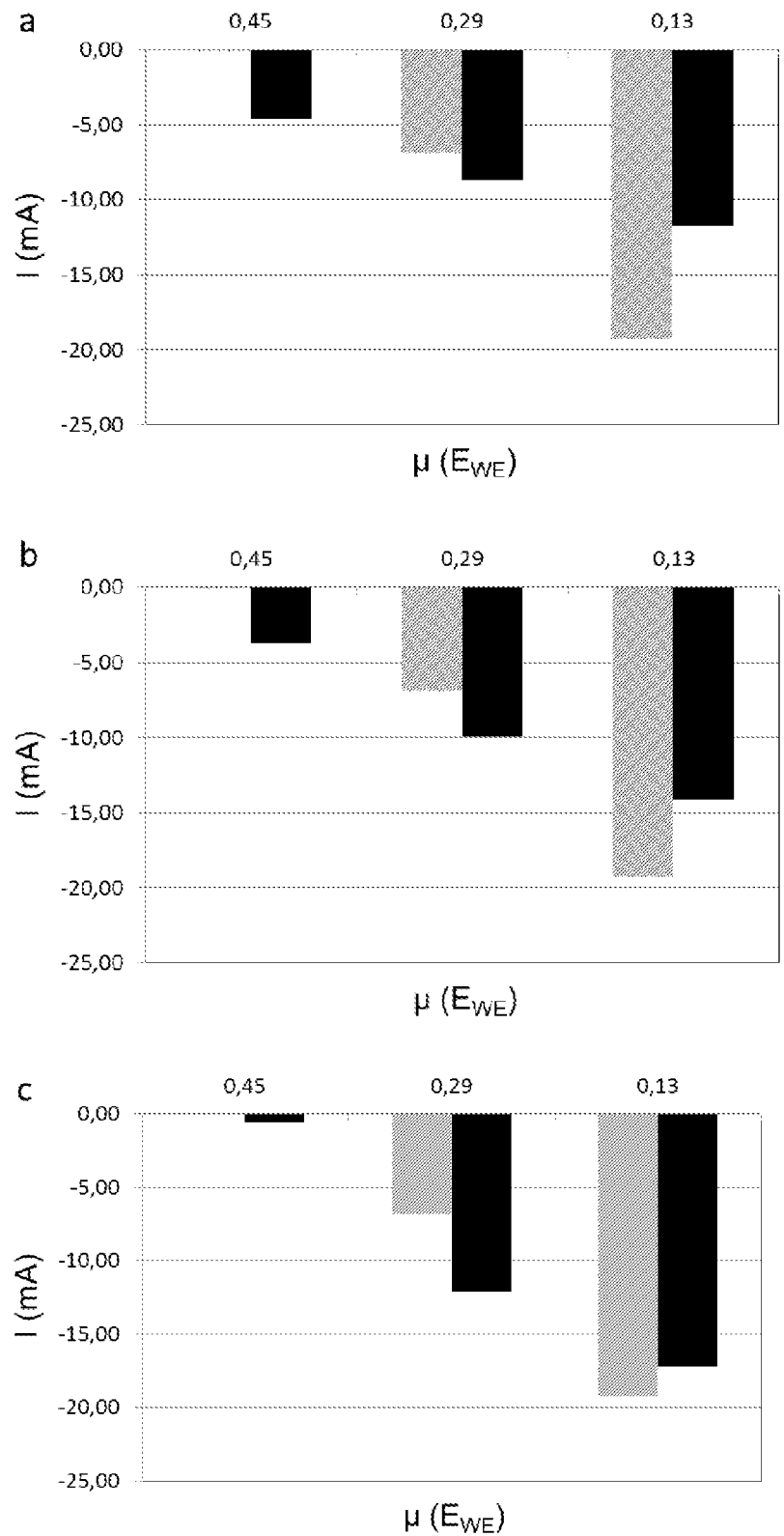
FIG. 15. Cathodic current intensity mean values (I<0), registered along the chronoamperometry tests, both during the supplied extrinsic stochastic disturbance (black bars) and in absence of the supplied extrinsic stochastic disturbance stages (patterned bars) for: a) Gaussian white noise (σ=0.3, Δt=1 s); b) Constant White noise (amplitude=0.3, Δt=1 s); and c) Pink noise (amplitude=0.8, Δt=1 s).

A positive effect of the intentional supplied extrinsic stochastic disturbance was also observed, especially in the surroundings of $E_{onset}$. In order to facilitate the analysis of the results from different experiments, cathodic current intensity mean values (I<0), registered along the chronoamperometry tests, have been estimated both during intentional supplying of the extrinsic stochastic disturbance (noise stage) (black bars) and in absence of the extrinsic stochastic disturbance (no-noise stage) (patterned bars). Results at three different $\mu$ ($E_{WE}$) values vs Ag/AgCl ($\mu$=0.13V, 0.29V, and 0.45V) are presented in FIG. 15 for three different types of intentionally supplied extrinsic stochastic disturbance: a) Gaussian white noise ($\sigma$=0.3, $\Delta t$=1 s); b) Constant white noise (amplitude=0.3, $\Delta t$=1 s); and c) Pink noise (amplitude=0.8, $\Delta t$=1 s).

Example 4. OER on Pt Electrodes. Intentional Supplying of an Extrinsic Stochastic Disturbance Following Different Patterns Electrochemical (PEC) measurements were conducted in a three-electrode quartz cell connected to a Bio-Logic SP-300 potentiostat, provided with linear scan generator. A 0.5 M NaOH solution (50 mL) was used as electrolyte. Coiled Pt was used as counter electrode and double-junction Ag/AgCl (10% $KNO_3$ filling solution) as reference electrode. Pt was used as working electrode.

In the present conditions, the working electrode acts as anode, oxidizing water molecules.

The potenciostat was controlled and monitored via an ad-hoc developed LabView application from National Instruments Spain in order to be able to introduce the extrinsic stochastic disturbance signal in the system.

A three-electrode configuration was used, thus implying that the set-up measure only half-cell reactivity, allowing the potential of the working electrode ($E_{WE}$) to be measured without compromising the stability of that reference electrode by passing current over it. The current flows between the working electrode and the counter electrode.

Figure 16:
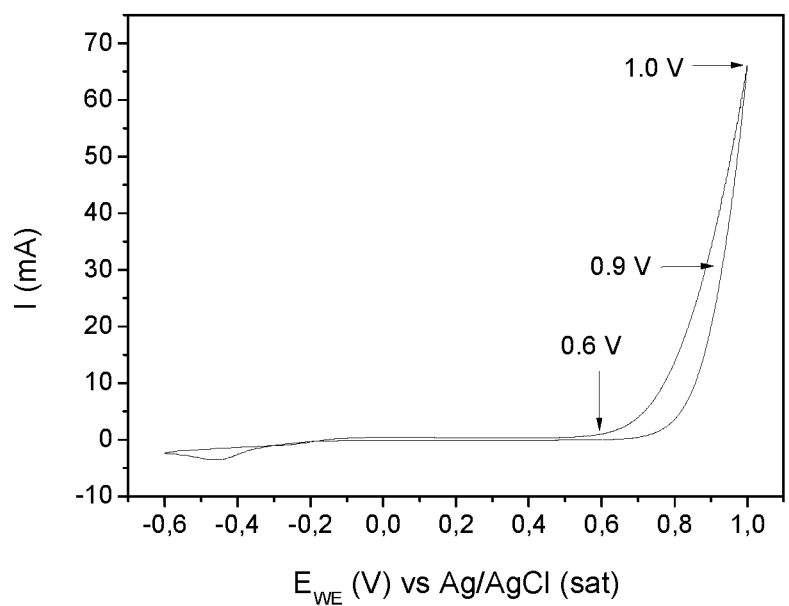
FIG. 16. Cyclic voltammetry of the Pt electrode in 0.5M NaOH. The three different $E_{WE}$ values applied in the chronoamperometry tests are marked with arrows.

For the sake of characterizing the system, the cyclic voltammetry of the electrode in the electrolyte is presented in FIG. 16, wherein the arrow marks the $E_{onset}$.

Experiments total time was 310 in all cases: 1st stage of 10 s without the intentionally supplied extrinsic stochastic disturbance; 2nd stage of 300 s with the intentionally supplied extrinsic stochastic disturbance; and 3th stage of 10 s without the intentionally supplied extrinsic stochastic disturbance. Data were registered every 0.005 s (dt).

Figure 17:
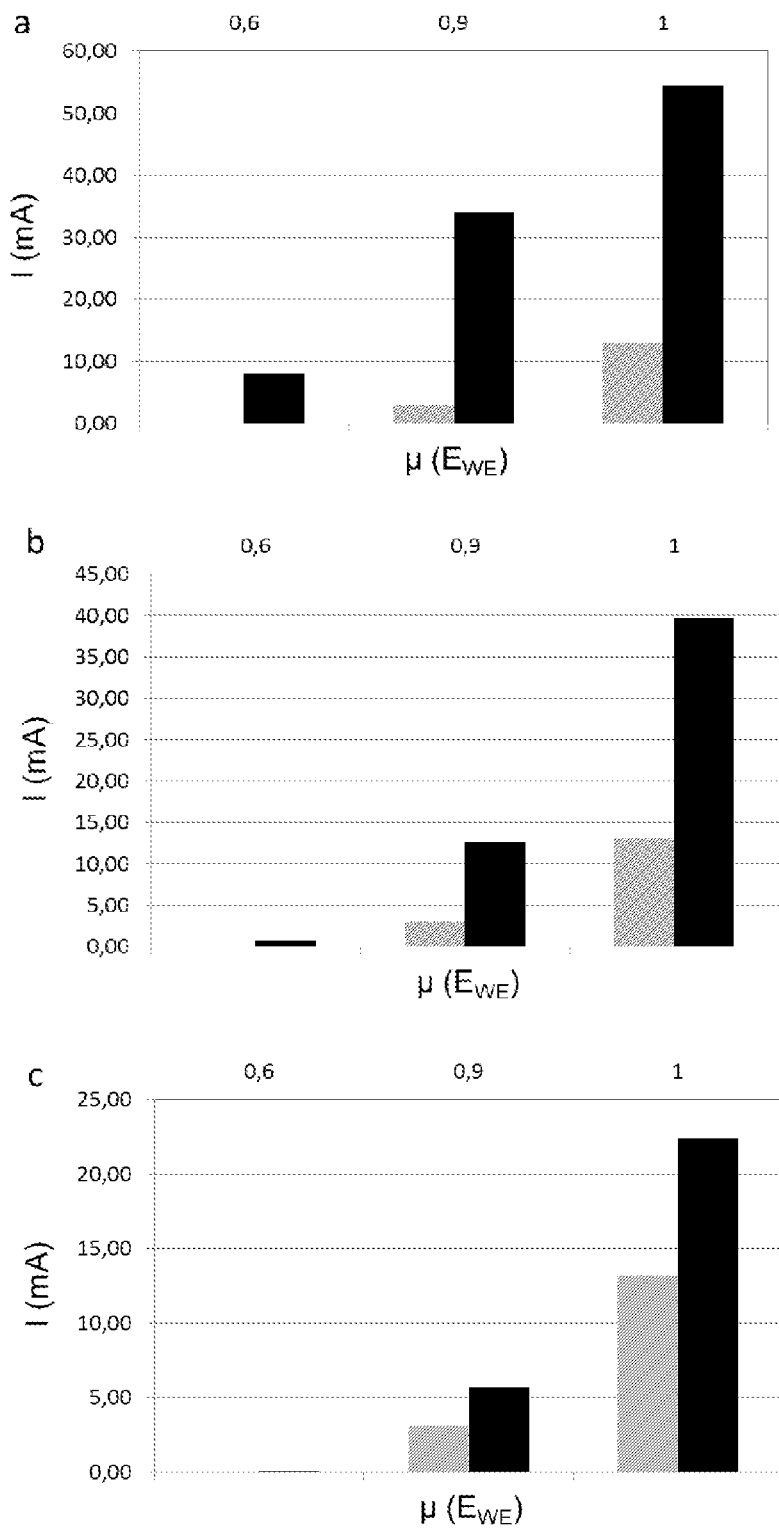
FIG. 17. Anodic current intensity mean values (I>0), registered along the chronoamperometry tests, both during the supplied extrinsic stochastic disturbance (black bars) and in absence of the supplied extrinsic stochastic disturbance stages (patterned bars) for: a) Gaussian White noise (σ=0.3, Δt=1 s); b) Constant White noise (amplitude=0.3, Δt=1 s); and c) Pink noise (amplitude=0.8, Δt=1 s).

In order to facilitate the analysis of the results from different experiments, anodic current intensity mean values (I>0), registered along the chronoamperometry tests, have been estimated both during intentional supplying the extrinsic stochastic disturbance (noise stage) (black bars) and in absence of the intentionally supplied extrinsic stochastic disturbance (no-noise stage) (patterned bars). Results at three different μ ($E_{WE}$) values vs Ag/AgCl (μ=0.6V, 0.9V, and 1.0V) are presented in FIG. 17 for three different types of intentionally supplied extrinsic stochastic disturbance: a) Gaussian white noise (σ=0.3, Δt=1 s); b) Constant white noise (amplitude=0.3, Δt=1 s); and c) Pink noise (amplitude=0.8, Δt=1 s).

An increased current intensity was also obtained in the presence of the intentionally supplied extrinsic stochastic disturbance, as in previous cases, although in this case the most relevant results are not obtained in the surroundings of $E_{onset}$, increasing the effect as μ ($E_{WE}$) moves to higher voltages.

These differences can be related with the different shape of the I-V curve of the electrode, compared to those of photoelectrodes. In the potential difference interval under study, there is no turning point in the I-V curve and no current saturation is reached for Pt, in contrast to what it was observed in photoelectrodes voltammetries.

Figure 18:
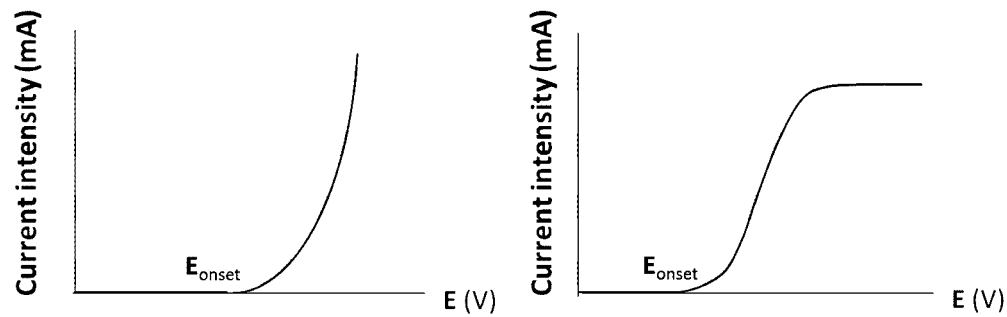
FIG. 18. Schematic generalization of the profile of the I-V curve of an electrode (left) and a photoelectrode (right).

In general terms, and simplifying, the profile of I-V curves of an electrode (left) and a photoelectrode (right) are shown in FIG. 18.

Experiments of oxidation of methylene blue (MB) in 0.1 M $K_2SO_4$ solution (50 mL) on Pt were also performed. The oxidation reactions were conducted under potentiostatic conditions, where current is measured as a function of time (dt=1 s). Methylene blue (MB) concentration was quantified by UV-Vis spectroscopy, analyzing the peak at λ=664 nm.

Figure 19:
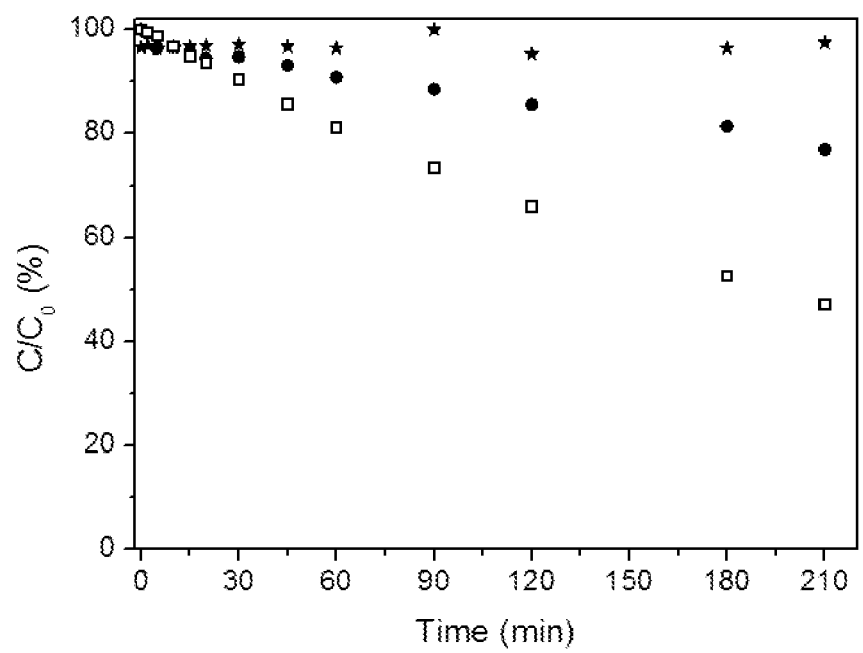
FIG. 19. Evolution of methylene blue concentration (%) during oxidation on Pt at different conditions: a) $E_{WE}$=1.0V vs Ag/AgCl in the absence of the supplied extrinsic stochastic disturbance (circles); b) $E_{WE}$=0.6 V vs Ag/AgCl in the absence of the supplied extrinsic stochastic disturbance (stars); and c) introducing Gaussian White Noise in $E_{WE}$, μ ($E_{WE}$)=0.6V vs Ag/AgCl, σ=0.3, Δt=1 s.

FIG. 19 shows the MB oxidation on Pt at different conditions: a) $E_{WE}$=1.0V vs Ag/AgCl in the absence of the intentionally supplied extrinsic stochastic disturbance (circles); b) $E_{WE}$=0.6 V vs Ag/AgCl in the absence of the intentionally supplied extrinsic stochastic disturbance (stars); and c) introducing Gaussian White Noise in $E_{WE}$, μ ($E_{WE}$)=0.6V vs Ag/AgCl, σ=0.3, Δt=1 s.

In the presence of Gaussian White Noise, a higher oxidation degree is achieved after 210 min compared to measurements at higher potentials in the absence of the intentionally supplied extrinsic stochastic disturbance.

The invention claimed is:

1. A method for operating an electrochemical device wherein a nonlinear chemical reaction operating in a non-oscillatory regime takes place; wherein the electrochemical device comprises a working electrode, and a counter electrode, and at least one electrolyte; and wherein the method comprises intentionally imposing an additive extrinsic stochastic disturbance to the potential difference which is established between the electrodes of the electrochemical device; thus an additive and intentionally imposed extrinsic stochastic disturbance is supplied in addition to the applied voltage; and wherein the additive and intentionally imposed extrinsic stochastic disturbance is externally controlled;
wherein the additive and intentionally imposed extrinsic stochastic disturbance is higher in absolute value and different to the inherent and intrinsic noise present within any signal;
wherein the term nonlinear chemical reaction means that the chemical reaction exhibits nonlinear dynamics as evidenced by the nonlinear relationship between electric current and applied voltage between electrodes;
wherein a chemical reaction operating in a non-oscillatory regime refers to dissipative systems wherein the system variables do not follow a harmonic function and the system is away from the equilibrium state;
wherein the mean value of the additive and intentionally imposed extrinsic stochastic disturbance supplied to the potential of the working electrode is within the range Eonset ±1V; wherein Eonset is the potential at which the electrochemical reaction begins to occur with the proviso that when the working electrode comprises a photoactive material, the mean value of the additive and intentionally imposed extrinsic stochastic disturbance supplied to the potential of the working electrode is at a point before reaching the turning point of the I-V curve of the electrode; and
wherein the method is only applicable to the non-oscillatory regime.

2. The method according to claim 1, wherein the additive and intentionally imposed extrinsic stochastic disturbance follows a noise pattern selected from a White noise pattern, a Colored noise pattern, and a Gaussian noise pattern.

3. The method according to claim 1, wherein the extrinsic stochastic disturbance application interval is comprised from 0.001 seconds to 5 seconds; wherein the extrinsic stochastic disturbance application interval refers to the duration of time of one event in the stochastic disturbance sequence.

4. The method according to claim 1, wherein the working electrode acts as anode, thereby an oxidation reaction of a target molecule takes place on its surface.

5. The method according to claim 1, wherein the working electrode acts as cathode, thereby a reduction reaction of a target molecule takes place on its surface.

6. The method according to claim 1, wherein the mean value of the additive and intentionally imposed extrinsic stochastic disturbance supplied to the potential of the working electrode is within the range Eonset ±0.2V; and wherein the working electrode comprises a photoactive material.

7. The method according to claim 6, wherein the intentionally imposed additive extrinsic stochastic disturbance follows a noise pattern selected from a White noise pattern, a Colored noise pattern, and a Gaussian noise pattern.

8. The method according to claim 6, wherein the extrinsic stochastic disturbance application interval is comprised from 0.001 seconds to 5 seconds; wherein the extrinsic stochastic disturbance application interval refers to the duration of time of one event in the stochastic disturbance sequence.

9. The method according to claim 1, wherein the working electrode does not comprise a photoactive material.

10. The method according to claim 9, wherein the intentionally imposed additive extrinsic stochastic disturbance follows a noise pattern selected from a White noise pattern, a Colored noise pattern, and a Gaussian noise pattern.

11. The method according to claim 9, wherein the extrinsic stochastic disturbance application interval is comprised from 0.001 seconds to 5 seconds; wherein the extrinsic stochastic disturbance application interval refers to the duration of time of one event in the stochastic disturbance sequence.

\* \* \* \* \*